(12) United States Patent
Kawai et al.

(10) Patent No.: US 11,493,357 B2
(45) Date of Patent: Nov. 8, 2022

(54) SUPERIMPOSED IMAGE DISPLAY DEVICE, SUPERIMPOSED IMAGE DRAWING METHOD, AND COMPUTER PROGRAM

(71) Applicant: AISIN CORPORATION, Kariya (JP)

(72) Inventors: Takashi Kawai, Anjo (JP); Toshinori Takeuchi, Anjo (JP); Kenji Watanabe, Anjo (JP); Hiroyuki Miyake, Anjo (JP)

(73) Assignee: AISIN CORPORATION, Kariya (JP)

( * ) Notice: Subject to any disclaimer, the term of this patent is extended or adjusted under 35 U.S.C. 154(b) by 133 days.

(21) Appl. No.: 16/993,497

(22) Filed: Aug. 14, 2020

(65) Prior Publication Data

US 2021/0063185 A1 Mar. 4, 2021

(30) Foreign Application Priority Data

Sep. 2, 2019 (JP) .............................. JP2019-159411

(51) Int. Cl.
*G01C 21/36* (2006.01)

(52) U.S. Cl.
CPC ....... *G01C 21/365* (2013.01); *G01C 21/3632* (2013.01); *G01C 21/3635* (2013.01)

(58) Field of Classification Search
CPC .............. G01C 21/365; G01C 21/3632; G01C 21/3635
See application file for complete search history.

(56) References Cited

U.S. PATENT DOCUMENTS

| 10,694,262 | B1* | 6/2020 | Hedman | H04N 21/44008 |
| 2005/0154505 | A1* | 7/2005 | Nakamura | G02B 27/01 |
| | | | | 701/1 |
| 2009/0005961 | A1* | 1/2009 | Grabowski | G02B 27/0101 |
| | | | | 701/532 |
| 2010/0153000 | A1 | 6/2010 | Akita et al. | |
| 2010/0157430 | A1* | 6/2010 | Hotta | G02B 27/01 |
| | | | | 359/630 |
| 2013/0142385 | A1* | 6/2013 | Mathieu | G01C 21/365 |
| | | | | 345/473 |
| 2014/0362195 | A1* | 12/2014 | Ng-Thow-Hing | G06V 40/20 |
| | | | | 348/51 |
| 2015/0130837 | A1* | 5/2015 | Ishikawa | G02B 27/0093 |
| | | | | 345/633 |
| 2015/0211877 | A1* | 7/2015 | Laycock | G02B 3/14 |
| | | | | 349/11 |
| 2016/0349066 | A1* | 12/2016 | Chung | G01C 21/3658 |

(Continued)

FOREIGN PATENT DOCUMENTS

JP 2007-121001 A 5/2007

*Primary Examiner* — Ibrahim A Khan

(74) *Attorney, Agent, or Firm* — Oliff PLC

(57) ABSTRACT

A guide object for proposing a guide target point is displayed when there is a guide target point that is to be proposed, ahead of a vehicle in a traveling direction. In contrast, when displaying the guide object, the guide object is displayed in a form in which an occupant visually recognizes the guide object with a relative position of the guide object with respect to the vehicle fixed, when a distance from the vehicle to the guide target point is equal to or more than a threshold. Further, the guide object is displayed in a form in which the occupant visually recognizes the guide object as being superimposed with a relative position of the guide object with respect to the guide target point fixed, when the distance from the vehicle to the guide target point is less than the threshold.

20 Claims, 12 Drawing Sheets

(56) References Cited

U.S. PATENT DOCUMENTS

| | | | |
|---|---|---|---|
| 2017/0060234 A1* | 3/2017 | Sung | G06F 3/147 |
| 2017/0187963 A1* | 6/2017 | Lee | G06V 20/56 |
| 2018/0297511 A1* | 10/2018 | Park | B60Q 1/1423 |
| 2019/0204104 A1* | 7/2019 | Kimura | G01C 21/3679 |
| 2020/0116518 A1* | 4/2020 | Lee | G01C 21/365 |

* cited by examiner

SUPERIMPOSED IMAGE DISPLAY DEVICE, SUPERIMPOSED IMAGE DRAWING METHOD, AND COMPUTER PROGRAM

INCORPORATION BY REFERENCE

The disclosure of Japanese Patent Application No. 2019-159411 filed on Sep. 2, 2019 including the specification, drawings and abstract is incorporated here by reference in its entirety.

BACKGROUND

1. Field

The disclosure relates to a superimposed image display device that performs travel assistance of a vehicle, a superimposed image drawing method, and a computer program.

2. Description of Related Art

Various means have been used as an information providing unit that provides an occupant of a vehicle with various types of information, such as route guidance and a warning for an obstacle, for assisting traveling of the vehicle. Examples of such tools include a liquid crystal display installed on the vehicle to provide visual indication and a speaker to output audio. One example of recent information providing units of this type is a device that provides information by displaying an image superimposed on the surrounding environment (view, real view) of the driver. For example, other than a head-up display and a windshield display, a method of displaying an image by superimposing the image on a captured image, which is displayed on a liquid crystal display, of the surroundings of the vehicle falls under such an information providing unit.

Here, it is effective to superimpose the image to be superimposed near a guide target point, when the guide target point that is to be proposed to occupants of the vehicle is proposed by displaying the image to be superimposed on the surrounding environment. A guide branch point at which the vehicle turns right or left, a feature (facility, sign etc.) that is a landmark of the guide branch point, and an obstacle to which attention needs to be drawn etc. fall under the guide target point. For example, in Japanese Unexamined Patent Application Publication No. 2007-121001 (JP 2007-121001 A) (page 7, FIG. 9), a technique is disclosed in which an image of an arrow that is superimposed on a guide target intersection included in an actual image ahead of a vehicle and that indicates a right or left turn direction is displayed, when the vehicle is positioned 300 m before the guide target intersection.

SUMMARY

In the technique described in JP 2007-121001 A, the image of the arrow is displayed when the vehicle is positioned 300 m before the guide target intersection. However, realistically, since the distance to the guide target intersection is extremely far when the vehicle is 300 m before, the guide target intersection can only be visually confirmed to be extremely small from the vehicle. Thus, the image of the arrow superimposed on the guide target intersection is extremely small, and it is difficult to recognize which direction to turn at which intersection is indicated by the image of the arrow.

Therefore, in the technique described in JP 2007-121001 A, although the image of the arrow is displayed when the vehicle is positioned 300 m before the guide target intersection, the timing at which the occupant can actually accurately recognize a content of the arrow (that is, the occupant can recognize which direction to turn at which intersection) is the timing at which the vehicle is closer to the guide target intersection. As a result, there has been a problem that a driving operation of the occupant is delayed from the guidance.

Exemplary embodiments have been made to address the foregoing issue of the related art, and therefore has an object to provide a superimposed image display device, a superimposed image drawing method, and a computer program capable of causing an occupant to accurately recognize a content of a guide object and to perform an appropriate driving operation, by causing the occupant to visually recognize the guide object in a visually recognizing form appropriate to a state of the vehicle.

A first superimposed image display device according to an embodiment for achieving the above object is a superimposed image display device that is installed in a vehicle, and that displays a guide object so that the guide object is visually recognized as being superimposed on a view of surroundings of the vehicle, the guide object proposing information to an occupant of the vehicle, the superimposed image display device including an object display unit that displays the guide object for proposing a guide target point to be proposed if any guide target point is ahead of the vehicle in a traveling direction, the object display unit displays the guide object in a first form in which the occupant visually recognizes the guide object as being superimposed with a relative position of the guide object with respect to the vehicle fixed, when a distance from the vehicle to the guide target point is equal to or more than a threshold, and the object display unit displays the guide object in a second form in which the occupant visually recognizes the guide object as being superimposed with a relative position of the guide object with respect to the guide target point fixed, when the distance from the vehicle to the guide target point is less than the threshold.

The term "view" includes an image of which a view is captured and an image that reproduces the view, in addition to the view (actual view) that is actually visually recognized from the vehicle.

A first superimposed image drawing method according to an embodiment includes the steps of: generating an image of a guide object for proposing a guide target point to be proposed if any guide target point is ahead of a vehicle in a traveling direction, the generating step being performed by an object generating unit; and drawing the generated image of the guide object at a position in an image display device at which the image is visually recognized as being superimposed on a view of surroundings of the vehicle, the drawing step being performed by an object drawing unit, in which the object drawing unit draws the guide object in a first form in which an occupant visually recognizes the guide object as being superimposed with a relative position of the guide object with respect to the vehicle fixed, when a distance from the vehicle to the guide target point is equal to or more than a threshold, and the object drawing unit draws the guide object in a second form in which the occupant visually recognizes the guide object as being superimposed with a relative position of the guide object with respect to the guide target point fixed, when the distance from the vehicle to the guide target point is less than the threshold.

A first computer program according to an embodiment is a program that assists traveling of a vehicle. Specifically, the first computer program is a computer program that causes a superimposed image display device that is installed in a vehicle and that displays a guide object so that the guide object is visually recognized as being superimposed on a view of surroundings of the vehicle, the guide object proposing information to an occupant of the vehicle, to function as an object display unit that displays the guide object for proposing a guide target point to be proposed if any guide target point is ahead of the vehicle in a traveling direction. The object display unit displays the guide object in a first form in which the occupant visually recognizes the guide object as being superimposed with a relative position of the guide object with respect to the vehicle fixed, when a distance from the vehicle to the guide target point is equal to or more than a threshold, and the object display unit displays the guide object in a second form in which the occupant visually recognizes the guide object as being superimposed with a relative position of the guide object with respect to the guide target point fixed, when the distance from the vehicle to the guide target point is less than the threshold.

A second superimposed image display device according to an embodiment is a superimposed image display device that is installed in a vehicle, and that displays a guide object so that the guide object is visually recognized as being superimposed on a view of surroundings of the vehicle, the guide object proposing information to an occupant of the vehicle, the superimposed image display device including an object display unit that displays the guide object for proposing a guide target point to be proposed if any guide target point is ahead of the vehicle in a traveling direction, in which the object display unit displays the guide object by switching from a first form in which the occupant visually recognizes the guide object as being superimposed with a relative position of the guide object with respect to the vehicle fixed to a second form in which the occupant visually recognizes the guide object as being superimposed with a relative position of the guide object with respect to the guide target point fixed, at a timing at which the guide object is visually recognized such that at least a part of the guide object is superimposed on the guide target point.

A second superimposed image drawing method according to an embodiment is a superimposed image drawing method including the steps of: generating an image of a guide object for proposing a guide target point to be proposed if any guide target point is ahead of a vehicle in a traveling direction, the generating step being performed by an object generating unit; and drawing the generated image of the guide object at a position in an image display device at which the image is visually recognized as being superimposed on a view of surroundings of the vehicle, the drawing step being performed by an object drawing unit, in which the object drawing unit displays the guide object by switching from a first form in which an occupant visually recognizes the guide object as being superimposed with a relative position of the guide object with respect to the vehicle fixed to a second form in which the occupant visually recognizes the guide object as being superimposed with a relative position of the guide object with respect to the guide target point fixed, at a timing at which the guide object is visually recognized such that at least a part of the guide object is superimposed on the guide target point.

A second computer program according to an embodiment is a program that assists traveling of a vehicle. Specifically, the second computer program is a computer program that causes a superimposed image display device that is installed in a vehicle and that displays a guide object so that the guide object is visually recognized as being superimposed on a view of surroundings of the vehicle, the guide object proposing information to an occupant of the vehicle, to function as an object display unit that displays the guide object for proposing a guide target point to be proposed if any guide target point is ahead of the vehicle in a traveling direction. The object display unit displays the guide object by switching from a first form in which the occupant visually recognizes the guide object as being superimposed with a relative position of the guide object with respect to the vehicle fixed to a second form in which the occupant visually recognizes the guide object as being superimposed with a relative position of the guide object with respect to the guide target point fixed, at a timing at which the guide object is visually recognized such that at least a part of the guide object is superimposed on the guide target point.

With the first superimposed image display device, the first superimposed image drawing method, and the first computer program, the occupant visually recognizes the guide object with the relative position of the guide object with respect to the vehicle fixed when the distance from the vehicle to the guide target point is far. Thus, it is possible to make the occupant clearly recognize the content of the guide object even when the distance from the vehicle to the guide target point is far. Therefore, a driving operation of the occupant can be suppressed from being delayed from the guidance and an appropriate driving operation can be performed. In contrast, the guide object is visually recognized by the occupant with the relative position of the guide object with respect to the guide target point fixed when the distance from the vehicle to the guide target point is near. Thus, it is possible to perform an effective guidance in which the guide target point and the guide object are associated with each other when visually recognized when the distance from the vehicle to the guide target point is near.

Further, with the second superimposed image display device, the second superimposed image drawing method, and the second computer program, the occupant visually recognizes the guide object with the form in which the relative position of the guide object with respect to the vehicle is fixed is switched to the form in which the relative position of the guide object with respect to the guide target point is fixed. Thus, the occupant can visually recognize the guide object in a visually recognizing form appropriate to a state, by changing the form in which the occupant visually recognizes the guide object based on the state, even if it is the same guide object. Specifically, the occupant can clearly visually recognize the content of the guide object regardless of the distance from the vehicle to the guide target point with the relative position of the guide object with respect to the vehicle fixed. In contrast, it is possible to perform an effective guidance in which the guide target point and the guide object are associated with each other when visually recognized with the relative position of the guide object with respect to the guide target point fixed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF THE EMBODIMENTS

Hereinafter, a first embodiment and a second embodiment in which a superimposed image display device according to an embodiment is actualized into a navigation device will be described in detail with reference to the drawings.

First Embodiment

Figure 1:
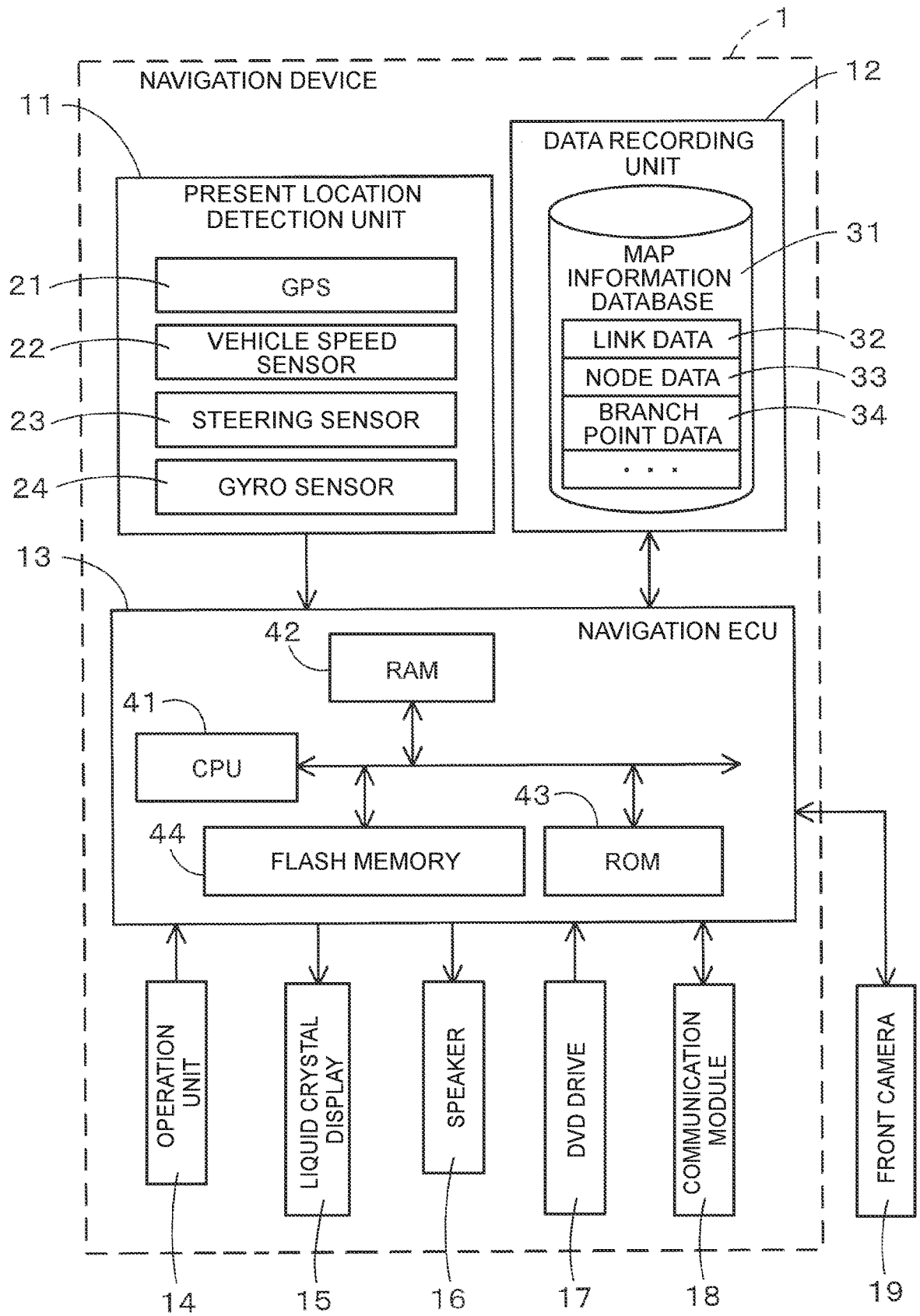
FIG. 1 is a block diagram illustrating a navigation device according to a first embodiment.

First, a schematic configuration of a navigation device 1 according to the first embodiment will be described with reference to FIG. 1. FIG. 1 is a block diagram illustrating the navigation device 1 according to the first embodiment.

As illustrated in FIG. 1, the navigation device 1 according to the first embodiment includes a present location detection unit 11 that detects a present location of the vehicle on which the navigation device 1 is mounted, a data recording unit 12 in which various types of data are recorded, a navigation electronic control unit (ECU) 13 that performs various types of calculation processing based on received information, an operation unit 14 that receives an operation from a user, a liquid crystal display 15 that displays an image of a captured actual view ahead of the vehicle in the traveling direction to the user, a speaker 16 that outputs voice guidance about route guidance, a DVD drive 17 that reads a DVD serving as a recording medium, and a communication module 18 that communicates with an information center such as a probe center and the VICS (registered trademark: Vehicle Information and Communication System) center. In addition, the navigation device 1 is connected to a front camera 19 and various sensors installed on the vehicle on which the navigation device 1 is mounted via an in-vehicle network such as a controller area network (CAN).

Hereinafter, the components of the navigation device 1 will be described one by one.

The present location detection unit 11 includes a global positioning system (GPS) 21, a vehicle speed sensor 22, a steering sensor 23, and a gyro sensor 24 etc., and is capable of detecting the present location of the vehicle, the direction, the travel speed of the vehicle, the current time, and so on. In particular, the vehicle speed sensor 22 is a sensor for detecting the travel distance of the vehicle and the vehicle speed. The vehicle speed sensor 22 generates pulses according to the rotation of the driving wheels of the vehicle, and outputs a pulse signal to the navigation ECU 13. The navigation ECU 13 counts the generated pulses to calculate the rotational speed of the drive wheels and the travel distance. It is not necessary that the navigation device 1 should include all of the four sensors, and the navigation device 1 may be configured to include only one or a plurality of such sensors.

The data recording unit 12 includes: a hard disk (not shown) that serves as an external storing device and a recording medium; and a recording head (not shown) that serves as a driver that reads a map information database 31, a predetermined program, and so forth recorded in the hard disk and writes predetermined data into the hard disk. The data recording unit 12 may be configured of a flash memory, a memory card, or an optical disk such as a CD or a DVD in place of the hard disk. The map information database 31 may be stored in an external server to be acquired by the navigation device 1 through communication.

Here, the map information database 31 is a storing unit for storing link data 32 on roads (links), node data 33 on node points, branch point data 34 on branch points, location data on locations such as facilities, map display data for displaying a map, search data for searching for a route, retrieval data for retrieving a location, and so forth, for example.

The stored link data 32 include: for links configuring a road, data representing the width of the road to which each link belongs, gradient, cant, bank, road surface state, number of lanes of the road, location at which the number of lanes is reduced, location at which the width is reduced, a railroad crossing, and so forth; for corners, data representing the radius of curvature, an intersection, a T junction, an entrance to and an exit from the corner, and so forth; for road attributes, data representing a descending road, an ascending road, and so forth; and for types of road, data representing an expressway and a general road (a national road, a prefectural road, and a narrow street, and so forth).

The stored node data 33 include: the coordinates (position) of a branch point (including an intersection, a T junction, etc.) of actual roads and a node point set every predetermined distance in accordance with the radius of curvature etc. on the roads; the node attribute representing whether the node is a node corresponding to an intersection or the like; a connected link number list which is a list of the link numbers of links connected to the node; an adjacent node number list which is a list of the node numbers of nodes that are adjacent to the node via a link; and data on the height (altitude) of each node point.

The stored branch point data 34 include: the name of the intersection of the branch point; node information specifying the node forming the branch point; connected link information specifying the link connected to the branch point; the name of the area corresponding to the link connected to the branch point; and information specifying the shape of the branch point. Structures that may be a landmark when proposing a right or left turn at the branch point are also stored.

The navigation ECU 13 is an electronic control unit that controls the whole navigation device 1, and includes a control processing unit (CPU) 41 serving as a calculation unit and a control unit, a random access memory (RAM) 42 that is used as a working memory when the CPU 41 performs various types of calculation processing and that stores route data and so on when a route is retrieved, a read-only memory (ROM) 43 storing a travel assistance processing program (FIG. 2) (described below) and so on in addition to a control program, and an internal storage unit such as a flash memory 44 that stores a program read from the ROM 43. The navigation ECU 13 has various means serving as processing algorithms. For example, an object display unit displays a guide object for proposing a guide target point to be proposed if any guide target point is ahead of the vehicle in the traveling direction.

The operation unit 14 is operated when entering the departure point as the travel start point and the destination as the travel end point, and includes a plurality of operation switches (not shown) such as various keys and buttons. The navigation ECU 13 performs control so as to execute various corresponding operation on the basis of a switch signal output in response to a depression of a switch or the like. The operation unit 14 may be configured to have a touch panel provided on the front surface of the liquid crystal display 15. Further, the operation unit 14 may be configured to have a microphone and a speech recognition device.

The liquid crystal display 15 displays a map image including roads, traffic information, operation guide, an operation menu, a description of keys, a guide route from the departure point to the destination, guide information according to the guide route, news, a weather report, time, mails, a TV program, and so forth. Particularly in the first embodiment, during normal traveling, a captured image captured by the front camera 19, that is, a view (actual view) of the surroundings of the vehicle (in particular, ahead of the vehicle) at the current time is displayed on the liquid crystal display 15, and the guide object is displayed superimposed on the view when required.

Here, the guide object displayed superimposed on the view includes information about the vehicle and various types of information used for assisting the occupant in driving. For example, the guide object may include a warning that warns the occupant of an object (other vehicles, pedestrians, and guide signs) to pay attention to, a guide route set in the navigation device 1, guide information (such as an arrow pointing the right or left turning direction, an icon indicating the landmark of the guide branch point, and the distance to the guide branch point) based on the guide route, a warning to be displayed on the road surface (such as collision warning and speed limit warning), partition lines of a lane in which the vehicle is traveling, the current vehicle speed, a shift position, an energy residual amount, an advertisement image, facility information, a guide sign, a map image, traffic information, news, a weather report, the time, and the screen of a connected smartphone. In the first embodiment described below, the guide object is the guide information for guiding a user at the guide branch point that is in the future course of the vehicle and ahead of the vehicle in the traveling direction. More specifically, the guide object is a plurality of arrows, which is displayed at a position that is along the future course of the vehicle and that is above the road on which the vehicle is currently travelling and which indicates the exiting direction at the guide branch point along the guide route.

The speaker 16 outputs audio guidance on travel along a guide route and guidance on traffic information based on an instruction from the navigation ECU 13.

The DVD drive 17 is a drive that can read data recorded in a recording medium such as a DVD and a CD. Then, music or a video is played, or the map information database 31 is updated, based on of the read data. A card slot for reading and writing of a memory card may be provided in place of the DVD drive 17.

The communication module 18 is a communication device for receiving traffic information including congestion information, traffic regulation information, traffic accident information, that is transmitted from a traffic information center, such as a VICS center or a probe center. Examples of the communication module 18 include a mobile phone and a DCM.

The front camera 19 is an image capturing device having a camera using a solid-state image sensor such as a charge-coupled device (CCD), and is disposed so that the optical axis extends forward in the traveling direction of the vehicle. The captured image captured by the front camera 19 is displayed on the liquid crystal display 15 as the view (actual view) of the surroundings of the vehicle (in particular, ahead of the vehicle) as described above.

Figure 2:
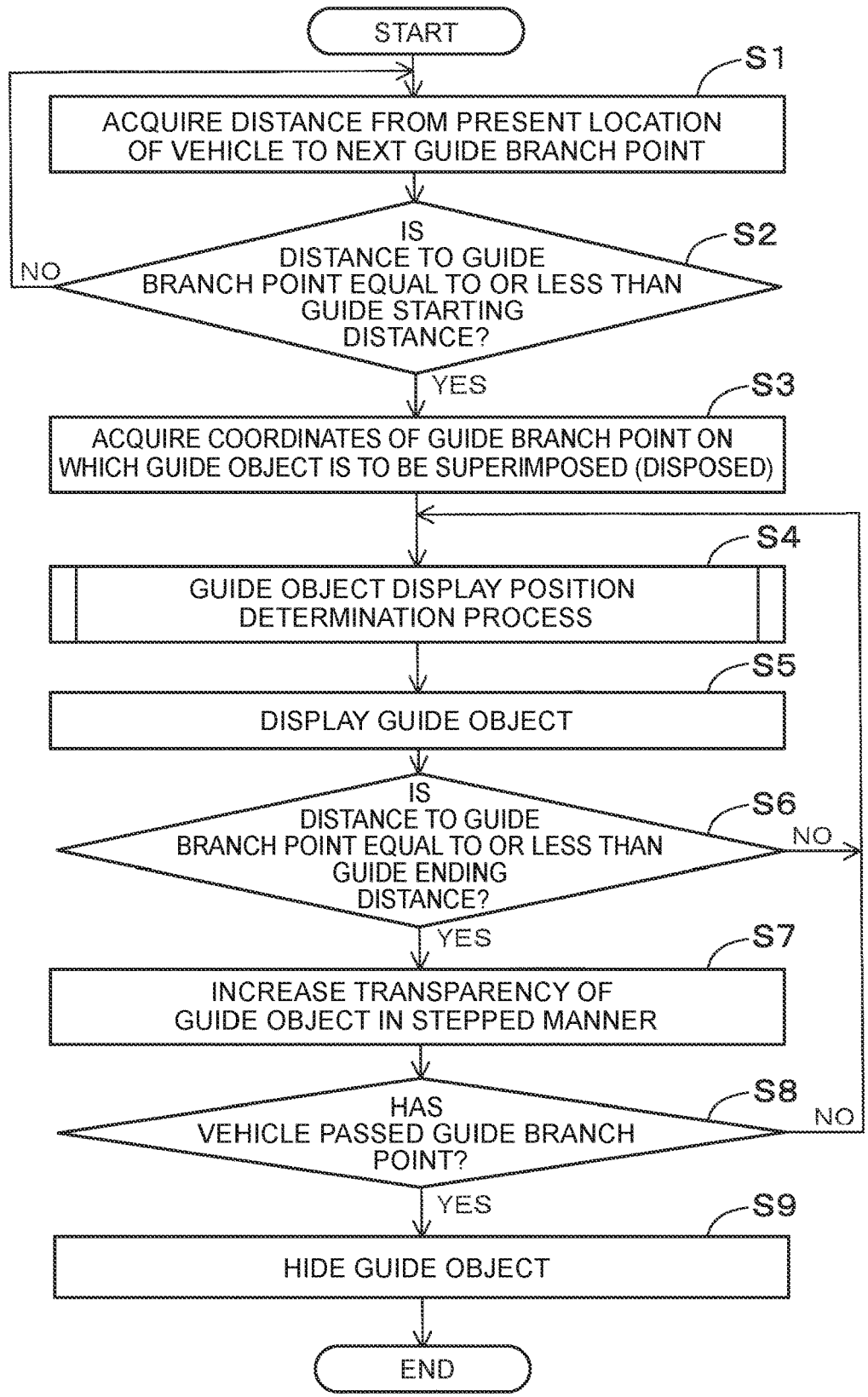
FIG. 2 is a flowchart of a travel assistance processing program according to the first embodiment.

In the following, a travel assistance processing program that is executed by the navigation ECU 13 of the navigation device 1 having the above configuration will be described with reference to FIG. 2. FIG. 2 is a flowchart of the travel assistance processing program according to the first embodiment. The travel assistance processing program is a program that is executed after an ACC power supply (accessory power supply) of the vehicle is turned on, and that assists traveling of the vehicle by having the user visually recognize the guide object superimposed on the view of the surroundings of the vehicle displayed on the liquid crystal display 15. The program illustrated in the flowcharts of FIGS. 2 and 4 described below is stored in the RAM 42 or the ROM 43 of the navigation device 1, and is executed by the CPU 41.

Described below is an example in which travel guidance for the vehicle along the guide route that is set in the navigation device 1 is performed as the travel assistance of the vehicle using the guide object. The guide object to be displayed is the guide information for guiding a user at the guide branch point that is in the future course of the vehicle and ahead of the vehicle in the traveling direction. More specifically, a process is described as an example in which the plurality of arrows, which is displayed at a position that is along the future course of the vehicle and that is above the road on which the vehicle is currently travelling and which indicates the exiting direction at the guide branch point along the guide route, is displayed as the guide object. However, with the navigation device 1, guidance and information other than the travel assistance described above can be provided with the guide object. Further, the guide object to be displayed can be information other than the arrows described above. For example, the guide object may include a warning that warns the occupant of an object (other vehicles, pedestrians, and guide signs) to pay attention to, a warning to be displayed on the road surface (such as collision warning and speed limit warning), partition lines of a lane in which the vehicle is traveling, the current vehicle speed, a shift position, an energy residual amount, an advertisement image, facility information, a guide sign, a map image, traffic information, news, a weather report, the time, and the screen of a connected smartphone.

In the travel assistance processing program, first, in step (hereinafter abbreviated as "S") 1, the CPU 41 specifies the present location of the vehicle based on a detection result of the present location detection unit 11 and the map information. When specifying the present location of the vehicle, map matching processing in which the present location of the vehicle is matched with the map information is also performed. Then, the guide route set in the navigation device 1 is read and the distance from the specified present location of the vehicle to the next guide branch point along the guide route is calculated. The guide branch point is a branch point (intersection) for which a right or left turn instruction is proposed when the navigation device 1 performs travel guidance along the guide route set in the navigation device 1.

Next, in S2, the CPU 41 determines whether the distance to the next guide branch point calculated in S1 is equal to or less than a prescribed guide starting distance. The guide starting distance is determined for each type of road on which the vehicle travels. For example, the guide starting distance is 300 m for an expressway. In contrast, for a general road, the guide starting distance is 150 m, which is shorter than that of the expressway, or is the distance from the guide branch point to another guide branch point when there is another guide branch point within 150 m before the guide branch point.

When it is determined that the distance to the next guide branch point calculated in S1 is equal to or less than the guide starting distance (S2: YES), the processing moves on to S3. In contrast, when it is not determined that the distance to the next guide branch point calculated in S1 is equal to or less than the guide starting distance (S2: NO), the processing returns to S1.

Figure 5:
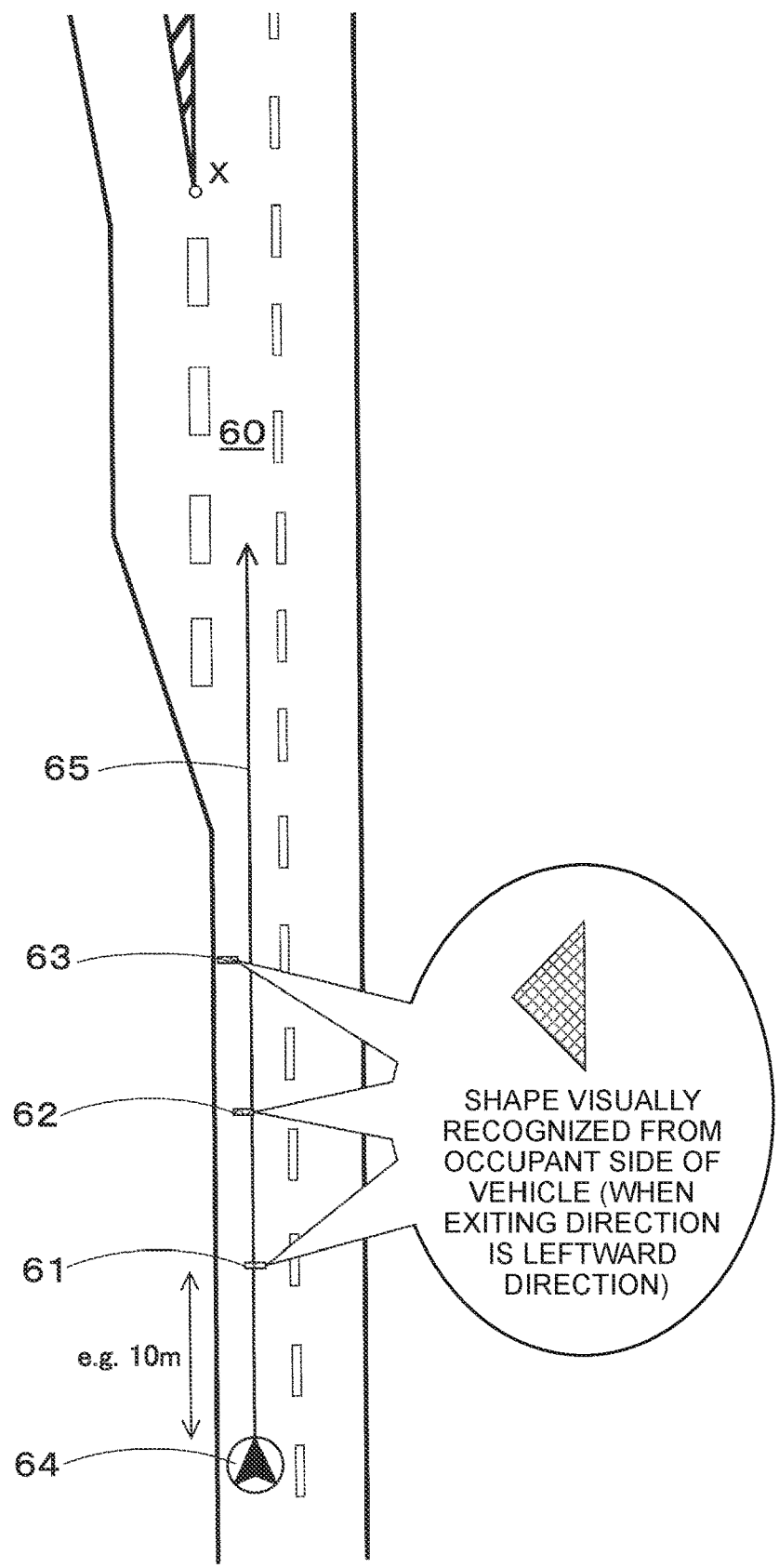
FIG. 5 illustrates a disposition example of the guide object when a vehicle is spaced away from a guide branch point.
Figure 7:
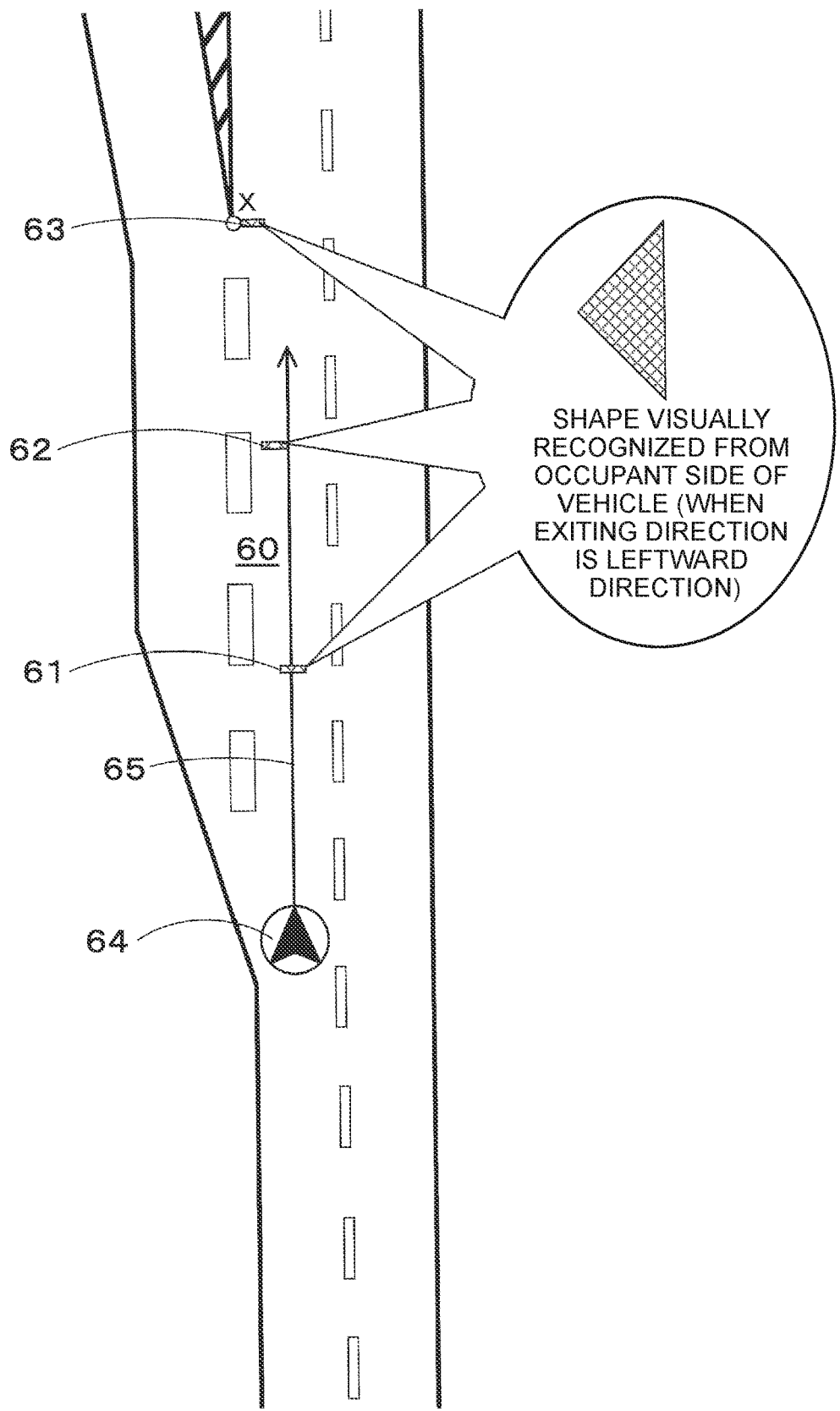
FIG. 7 illustrates a disposition example of the guide object when the vehicle is approaching the guide branch point.

In S3, the CPU 41 acquires coordinates of a point that is to be proposed by the guide object, that is, a point (hereinafter referred to as a guide point) at which the guide object is to be superimposed (disposed). Since the right or left turn is proposed at the guide branch point by using the guide object in the first embodiment, the guide branch point corresponds to the guide point and thus, the coordinates of the guide point correspond to coordinates X of the guide branch point. Although the coordinates X of the guide branch point are specified from the map information provided in the navigation device 1, the coordinates X may be specified by performing image recognition processing on the image captured by the front camera 19. In such a case, a vertex of a zebra zone on the near side at a branch is set as the coordinates X of the guide branch point as illustrated in FIGS. 5 and 7, for the expressway for example.

Figure 4:
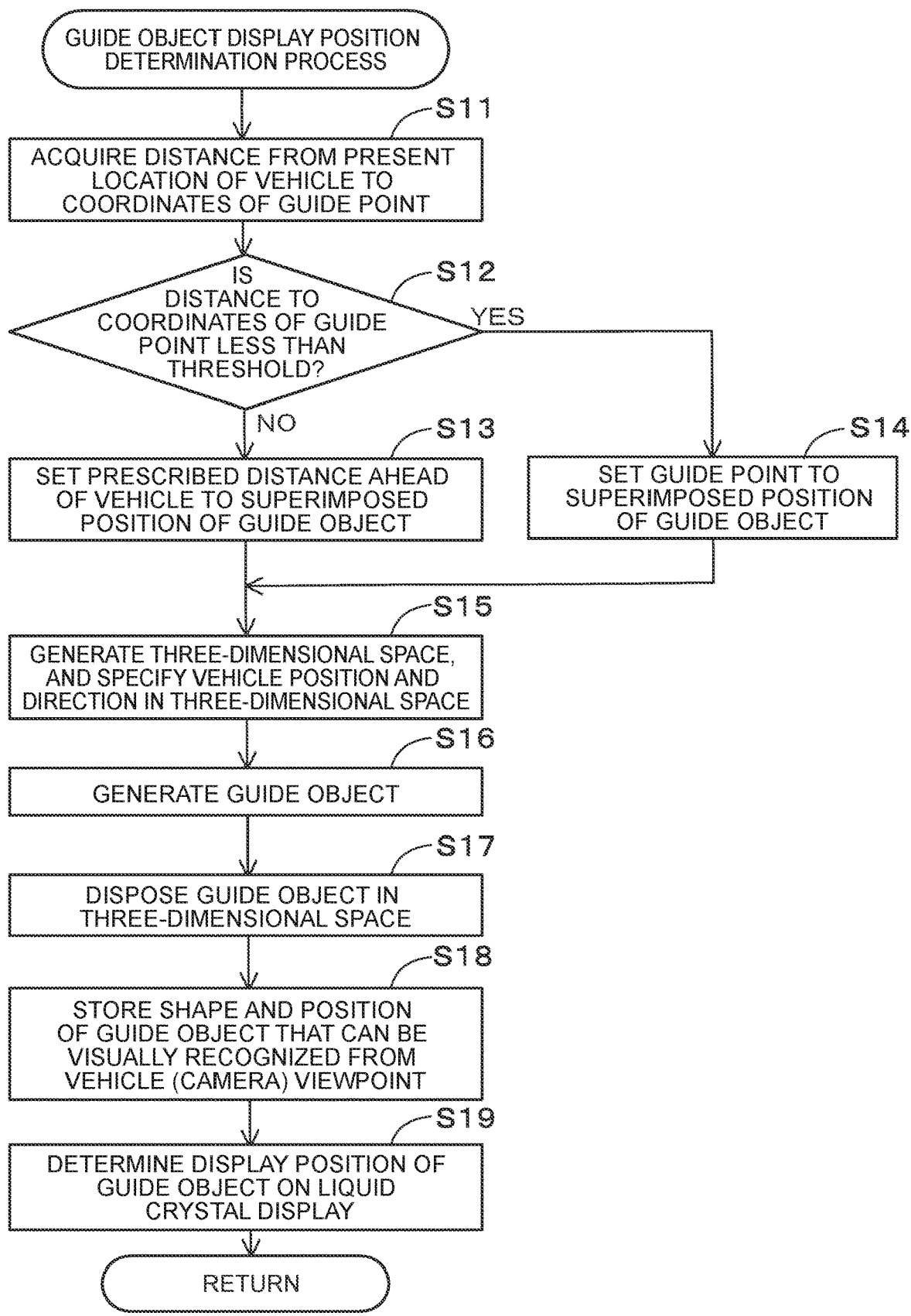
FIG. 4 is a flowchart of a sub-processing program of guide object display position determination processing.

Next, in S4, the CPU 41 performs guide object display position determination processing (FIG. 4). The guide object display position determination processing is processing that specifically determines the shape of the guide object and the position (range) at which the guide object is displayed on the liquid crystal display 15 based on the present location of the vehicle and the coordinates of the guide point acquired in S3. The shape of the guide object and the position at which the guide object is displayed that are determined in S4 are conditions for superimposing the guide object on a portion above the road spaced away from the vehicle by a prescribed distance and on the guide point in the view so that the occupant visually recognize the guide object.

Next, in S5, the CPU 41 generates an image of the guide object having a shape determined in S4, transmits a control signal to the liquid crystal display 15, and draws the generated image of the guide object in the liquid crystal display 15 at the position (range) determined in S4. A captured image captured beforehand by the front camera 19, that is, the view (actual view image) of the surroundings of the vehicle (in particular, ahead of the vehicle) at the current time is displayed in the liquid crystal display 15. As a result, it is possible to make the occupant of the vehicle visually recognize the guide object superimposed on the view.

Figure 3:
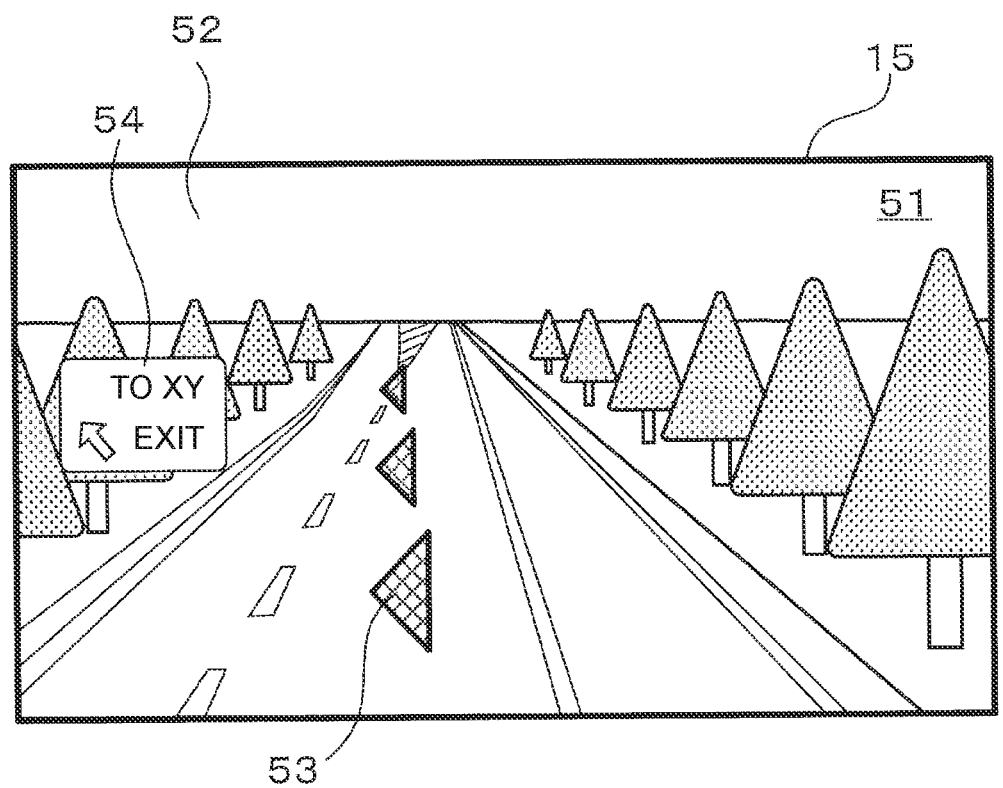
FIG. 3 illustrates an example of a travel guide screen displayed on a liquid crystal display.

FIG. 3 illustrates an example of a travel guide screen 51 displayed on a liquid crystal display 15 in S5. As illustrated in FIG. 3, a view 52 ahead of the vehicle at the current time captured by the front camera 19 is displayed on the liquid crystal display 15. An image 53 of the guide object is displayed superimposed on the view 52 ahead of the vehicle. The image 53 of the guide object includes images of a plurality of objects having an arrow shape, and is displayed so that the images of the objects are positioned above the road on which the vehicle is currently traveling and along the future course at prescribed intervals. The direction of each arrow indicates the exiting direction at the guide branch point. As described below, the image 53 of the guide object is displayed in a form (hereinafter referred to as a first form) in which the relative position of the image 53 with respect to the vehicle is fixed while the vehicle is spaced away from the guide branch point. When the vehicle approaches the guide branch point to some extent, the first form is switched to a form (hereinafter referred to as a second form). In the second form, the image 53 is displayed such that the relative position of the image 53 with respect to the guide branch point in the view 52 is fixed. Especially in the second form, the relative position is fixed with a part of the image 53 of the guide object superimposed on the guide branch point. Thus, when the occupant of the vehicle visually recognizes the travel guide screen 51, the occupant can accurately recognize the course of the vehicle, the position of the guide branch point that is a right or left turn target, and the exiting direction at the guide intersection.

Other than the arrows indicating the exiting direction of the vehicle at the guide branch point described above as the guide object, an image 54 of a guide sign indicating the exiting direction at the guide branch point may be displayed superimposed on the view as described in FIG. 3. The image 54 of the guide sign includes an arrow indicating the exiting direction at the guide branch point and a name of an area corresponding to the exiting direction. Further, a position at which the image 54 of the guide sign is superimposed is a position at which the image 54 can be visually recognized above a road side zone 300 m before the guide branch point while the distance from the vehicle to the guide branch point is 1 km or less and 300 m or more. While the distance from the vehicle to the guide branch point is less than 300 m, the position at which the image 54 is superimposed is a position at which the image 54 can be visually recognized above the road side zone that is 10 m ahead of the present location of the vehicle.

Further, an image, which indicates the distance to the guide intersection, serving as the guide object may be displayed superimposed on the view. The position at which the image indicating the distance to the guide intersection is superimposed is ahead of and near the vehicle and is displayed while the distance from the vehicle to the guide branch point is within a prescribed distance section (for example, 300 m to 150 m), for example.

Then, in S6, the CPU 41 calculates the distance from the present location of the vehicle to the next guide branch point along the guide route, and determines whether the calculated distance to the next guide branch point is equal to or less than a prescribed guide ending distance, similar to S1 described above. The guide ending distance is determined for each type of road on which the vehicle travels. For example, the guide ending distance is 30 m for an expressway and 10 m for a general road, which is shorter than that for an expressway.

When it is determined that the distance to the next guide branch point is equal to or less than the guide ending distance (S6: YES), and the process moves on to S7. In contrast, when it is not determined that the distance to the next guide branch point is equal to or less than the guide ending distance (S6: NO), the process returns to S4, and the guide object is continuously displayed.

Subsequently, in S7, the CPU 41 transmits a control signal to the liquid crystal display 15 and increases in stages, transparency of the image of the guide object displayed on the liquid crystal display 15, in accordance with the distance to the guide branch point. Specifically, the transparency is increased so that the transparency becomes 100% when the vehicle reaches the guide branch point. The transparency is set to 20% for example instead of 0% when the image of the guide object starts being displayed, so that the occupant of the vehicle can recognize the view hidden behind the image of the guide object. Thus, the image of the guide object is displayed with the transparency at 20% until the distance from the vehicle to the guide branch point is equal to or less than the guide ending distance, the transparency is then increased in stages such as from 20% to 30% then to 40% and so on as the vehicle approaches the guide branch point, and in the end, the transparency is 100% when the vehicle reaches the guide branch point.

Subsequently, in S8, the CPU 41 determines whether the vehicle has passed the guide branch point. For example, this is determined based on the map information and the present location of the vehicle that is detected by the present location detection unit 11.

When it is determined that the vehicle has passed the guide branch point (S8: YES), the control signal is transmitted to the liquid crystal display 15, and the guide object displayed on the liquid crystal display 15 is hidden (S9). The captured image captured by the front camera 19, that is, the view (actual view) of the surroundings of the vehicle (in particular, ahead of the vehicle) at the present time is continuously displayed. However, the image of the view may be hidden and the display screen of the liquid crystal display 15 may be switched so that the map image is displayed.

In contrast, when it is determined that the vehicle has not passed the guide branch point (S8: NO), the process returns to S4, and the guide object is continuously displayed.

In the following, guide object display position determination processing executed in S4 described above will be described based on FIG. 4. FIG. 4 is a flowchart of a sub-processing program of guide object display position determination processing.

First, in S11, the CPU 41 specifies the present location of the vehicle based on the detection result of the present location detection unit 11 and the map information. When specifying the present location of the vehicle, map matching processing in which the present location of the vehicle is matched with the map information is also performed. Then, the distance from the specified present location of the vehicle to the coordinates of the guide point acquired in S3 (that is, the guide branch point) is calculated.

Then, in S12, the CPU 41 determines whether the distance to the coordinates of the guide point calculated in S11 is less than a prescribed threshold. The timing at which the distance to the coordinates of the guide point is equal to the threshold is the timing at which at least a part of the image of the guide object, which is displayed on the liquid crystal display 15 with the relative position of the guide object to the vehicle fixed as in S13 described below (displayed in the first form), is superimposed on the guide point, that is, the timing at which the guide object is visually recognized by the occupant of the vehicle such that the guide object is superimposed on the guide branch point. The details will be described below.

When it is determined that the distance to the guide point calculated in S11 is less than the threshold (S12: YES), the process moves on to S14. In contrast, when it is determined that the distance to the next guide point calculated in S11 is equal to or more than the threshold (S12: NO), the process moves on to S13.

In S13, the CPU 41 sets "the position at which the guide object is superimposed on the view" at the position at which the occupant visually recognizes the guide object as being superimposed on the view with the relative positon to the vehicle fixed (the position for displaying the guide object in the first form). Specifically, the position ahead of the present location of the vehicle by a predetermined distance (for example, 10 m ahead) is the position at which the guide object is superimposed (disposed).

In contrast, in S14, the CPU 41 sets "the position at which the guide object is superimposed on the view" at the position at which the occupant visually recognizes the guide object as being superimposed on the view with the relative position of the guide object to the guide point (that is, the guide branch point) fixed (the position for displaying the guide object in the second form). Specifically, the above position is the position at which the guide object is visually recognized such that at least a part of the guide object is superimposed on the guide point (including the surroundings).

Subsequently, in S15, the CPU 41 generates a three-dimensional space corresponding to the surroundings of the present location of the vehicle (in particular, ahead of the vehicle in the traveling direction). In the three-dimensional space, buildings and road signs may be modeled in addition to roads, or only roads may be modeled. Alternatively, the three-dimensional space may simply be a blank space in which there is only the ground and no roads are modeled. Further, the three-dimensional space may be stored beforehand in the map information database 31 as three-dimensional map information and the three-dimensional map information of the surroundings of the corresponding own vehicle position may be read from the map information database 31 in S15. The three-dimensional space may be generated based on the image captured by the front camera 19. For example, by performing point group matching on the captured image captured by the front camera 19, it is possible to detect a road and a structure nearby the road to generate the three-dimensional space.

In S15, the CPU 41 also specifies the present location and direction of the own vehicle in the generated three-dimensional space, based on parameters detected by the present location detection unit 11. Specifically, the position of the front camera 19 installed in the vehicle is set as the present location of the own vehicle and an optical axis direction of the front camera 19 is set as the direction of the own vehicle. The position of the front camera 19 also corresponds to the position of the occupant and the optical axial direction of the front camera 19 also corresponds to a sight line direction of the occupant of the vehicle.

Figure 6:
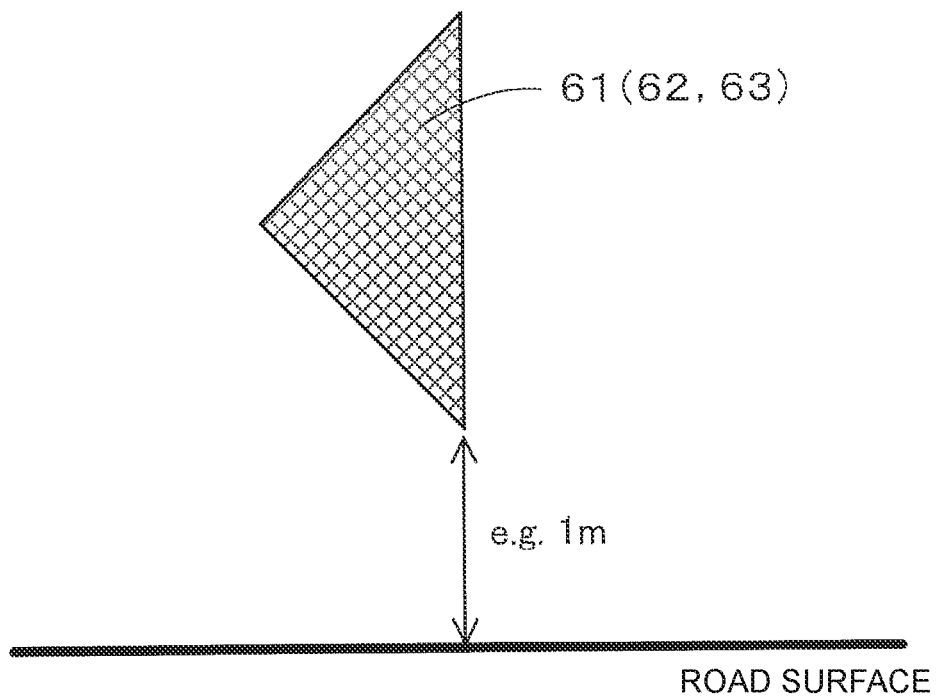
FIG. 6 illustrates a disposition example of the guide object when a vehicle is spaced away from the guide branch point.

Subsequently, in S16, the CPU 41 generates the guide object to be displayed on the liquid crystal display 15. In the first embodiment, the guide object is set as the arrow indicating the exiting direction at the guide branch point ahead of the vehicle in the travelling direction. Specifically, three arrows 61 to 63 having an isosceles triangle shape are generated as illustrated in FIGS. 5 to 7. When the guide route is a route in which the vehicle will turn right at the guide intersection that is ahead of the vehicle in the traveling direction, the arrow indicates the rightward direction. When the guide route is a route in which the vehicle will turn left at the guide intersection that is ahead of the vehicle in the traveling direction, the arrow indicates the leftward direction. The guide object is a two-dimensional polygon and basically has no thickness. However, the guide object may be a three-dimensional polygon having a thickness. The shape of the guide object generated in S16 may be changed as needed and may be a shape other than an arrow if the guide object can indicate the exiting direction at the guide branch point. Further, the guide object does not have to be three arrows and may be only one arrow.

Then, in S17, the CPU 41 disposes the guide object generated in S16 in the three-dimensional space generated in S15. The position at which the guide object is disposed in the three-dimensional space is determined based on "the position at which the guide object is superimposed on the view" that is set in S13 or S14.

For example, when "the position at which the guide object is superimposed on the view" is set at the position ahead of the present location of the vehicle by the prescribed distance (such as 10 m ahead) in S13, the three arrows 61 to 63 that are the guide objects are disposed at prescribed intervals at positions that are above the road on which a vehicle 64 is currently traveling in the three-dimensional space and that are each ahead of the present location of the vehicle 64 by a prescribed distance, as illustrated in FIG. 5. Further, the three arrows 61 to 63 are disposed at positions along a future course 65 of the vehicle. Here, FIG. 5 illustrates a disposition example of the guide object when the guide route in which the vehicle will exit a guide branch point 60 of an expressway in the leftward direction is set. Specifically, the three arrows 61 to 63 are arranged at equal intervals along the course 65 of the vehicle as illustrated in FIG. 5. In particular, the three arrows 61 to 63 are disposed at positions such that a distance from the present location of the vehicle to the arrow 61 that is the nearest to the vehicle among the three arrows 61 to 63 is the fixed prescribed distance (such as 10 m). Here, each arrow 61 to 63 has an isosceles triangle shape and is disposed so as to be parallel to a direction intersecting with the traveling direction (that is, so that a front face faces the vehicle side). The arrows 61 to 63 indicate the exiting direction with a direction of a vertex angle with respect to a bottom surface, and is each an isosceles triangle in which the vertex angle faces the leftward direction as illustrated in FIG. 5 when the vehicle is to exit the guide branch point 60 in the leftward direction. Although the disposition intervals of the three arrows 61 to 63 may be changed as needed, the disposition intervals are 10 m, for example. The three arrows 61 to 63 are not arranged such that the row of the arrows 61 to 63 is in parallel to the course 65 of the vehicle. The three arrows 61 to 63 are arranged such that the row of the arrows 61 to 63 is gradually inclined as viewed from above so that the arrow visually recognized at a position closer to the guide branch point 60 is positioned closer to the traveling direction side (left side in FIG. 5) of the guide branch point 60 with respect to the course 65 of the vehicle. In particular, the three arrows 61 to 63 are disposed under the condition that the arrows 61 to 63 do not overlap with each other by a prescribed percentage (such as 20%) or more when visually recognized from the vehicle 64. However, the arrows 61 to 63 may be arranged in parallel to the traveling direction. In contrast, regarding a perpendicular direction, the arrows 61 to 63 are disposed so that lower ends of the arrows 61 to 63 are at positions spaced away from the road surface by a prescribed distance (such as 1 m), as illustrated in FIG. 6.

In contrast, when "the position at which the guide object is superimposed on the view" is set at the position at which the guide object is visually recognized such that at least a part of the guide object is superimposed on the guide point (that is, the guide branch point) in S14, the three arrows 61 to 63 that are the guide objects are disposed at prescribed intervals at positions that are above the road on which the vehicle 64 is currently traveling in the three-dimensional space and that are guide branch points, as illustrated in FIG. 7. Further, the three arrows 61 to 63 are disposed at positions along the future course 65 of the vehicle. Here, FIG. 7 illustrates a disposition example of the guide object when the guide route in which the vehicle will exit a guide branch point 60 of an expressway in the leftward direction is set. Specifically, the three arrows 61 to 63 are arranged at equal intervals along the course 65 of the vehicle, as illustrated in FIG. 7. In particular, a left side end portion of the arrow 63 (a right side end portion when the arrow 63 is a rightward direction arrow) that is the closest to the traveling direction side among the three arrows 61 to 63 is at a position that matches (matches with respect to a horizontal direction) coordinates X of the guide branch point. Although the coordinates X of the guide branch point are specified from the map information provided in the navigation device 1, the coordinates X may be specified by performing image recognition processing on the image captured by the front camera 19. In such a case, the vertex of a zebra zone at a branch is set as the coordinates X of the guide branch point. Although the disposition intervals of the three arrows 61 to 63 may be changed as needed, the disposition intervals are 10 m for example. The three arrows 61 to 63 are not arranged such that the row of the arrows 61 to 63 is in parallel to the course 65 of the vehicle. The three arrows 61 to 63 are arranged such that the row of the arrows 61 to 63 is gradually inclined as viewed from above so that the arrow visually recognized at a position closer to the guide branch point 60 is positioned closer to the traveling direction side (left side in FIG. 7) of the guide branch point 60 with respect to the course 65 of the vehicle. In particular, the arrows 61 to 63 are disposed under the condition that the arrows 61 to 63 do not overlap with each other by a prescribed percentage (such as 20%) or more when visually recognized from the vehicle 64. However, the arrows 61 to 63 may be arranged in parallel to the traveling direction. In contrast, regarding a perpendicular direction, lower ends of the arrows 61 to 63 are disposed at positions spaced away from the road surface by a prescribed distance (such as 1 m), as illustrated in FIG. 6.

Figure 8:
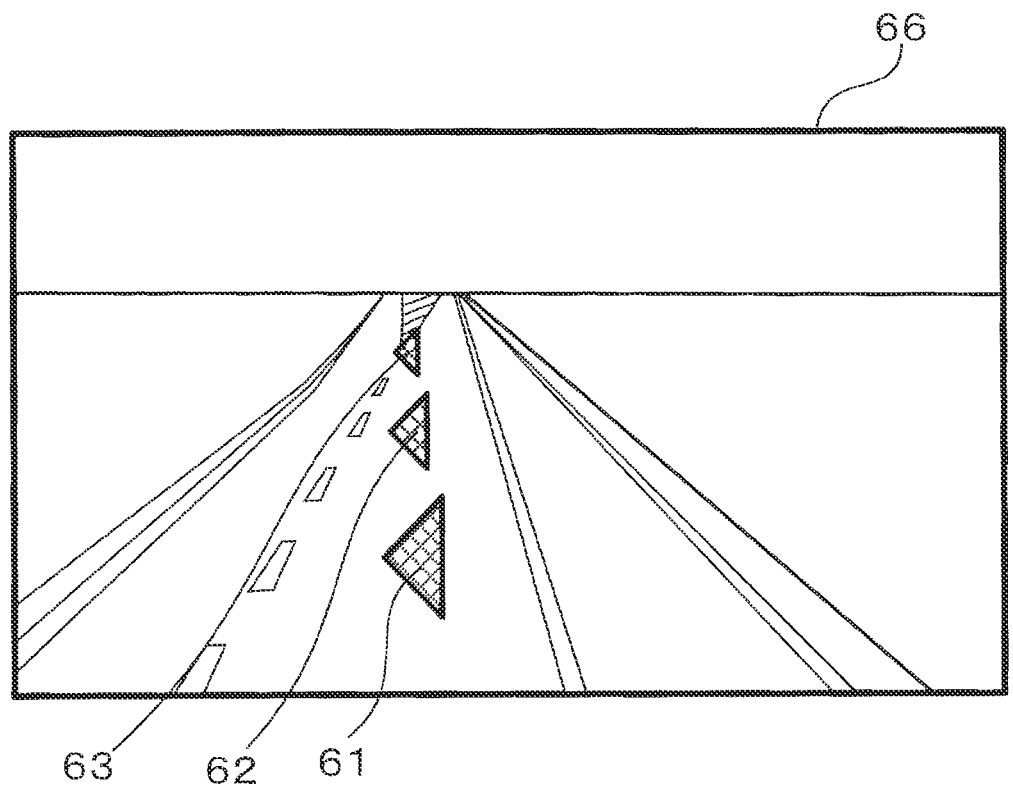
FIG. 8 illustrates an example of a visually recognized image in which the guide object disposed in a three-dimensional space is visually recognized.

Then, in S18, the CPU 41 first acquires an image (hereinafter referred to as a visually recognized image) in which the three-dimensional space where the guide object is disposed is visually recognized in the traveling direction of the vehicle from the vehicle position specified in S15 (corresponding to a viewpoint). For example, FIG. 8 illustrates a visually recognized image 66 that is acquired when the vehicle and the guide object are disposed in the form illustrated in FIG. 7. In particular, since the position of the vehicle is set as the position of the front camera 19, the acquired visually recognized image 66 is an image that is visually recognized when the guide object disposed in the three-dimensional space is visually recognized in the traveling direction of the vehicle from the viewpoint of the front camera 19. However, the acquired visually recognized image 66 also corresponds to a field of view of the occupant of the vehicle.

Then, the CPU 41 stores the shape of the guide object and the position of the guide object included in the visually recognized image 66 as the shape of the guide object and the position of the guide object that is to be displayed by the liquid crystal display 15. Here, the shape of the guide object stored in S18 is the shape of the guide object that can be visually recognized when the guide object disposed in the three-dimensional space is visually recognized from the viewpoint of the vehicle (more accurately, the front camera 19). Further, the position of the guide object stored in S18 is the position of the guide object that can be visually recognized when the guide object disposed in the three-dimensional space is visually recognized from the viewpoint of the vehicle (more accurately, the front camera 19). As described above, the guide object in the three-dimensional space is disposed on the road on which the vehicle is currently traveling along the course of the vehicle. Thus, the shape and the position of the guide object stored in S18 are based on the road shape of the road on which the vehicle is currently traveling and the future course of the vehicle. The guide object included in the visually recognized image 66 is the image in which the arrows 61 to 63 do not overlap with each other by the prescribed percentage (such as 20%) or more.

Then, in S19, the CPU 41 determines a range in which the guide object is displayed on the liquid crystal display 15 based on the shape of the guide object and the position of the guide object stored in S18. The display range of the guide object is the range in which the guide object having the shape stored in S18 is displayed at the same position as the guide object displayed in the three-dimensional space. The process then moves on to S5, the control signal is transmitted to the liquid crystal display 15 as described above, and the image of the guide object having the shape stored in S18 is displayed on the liquid crystal display 15 in the display range that is determined in S19.

Figure 9:
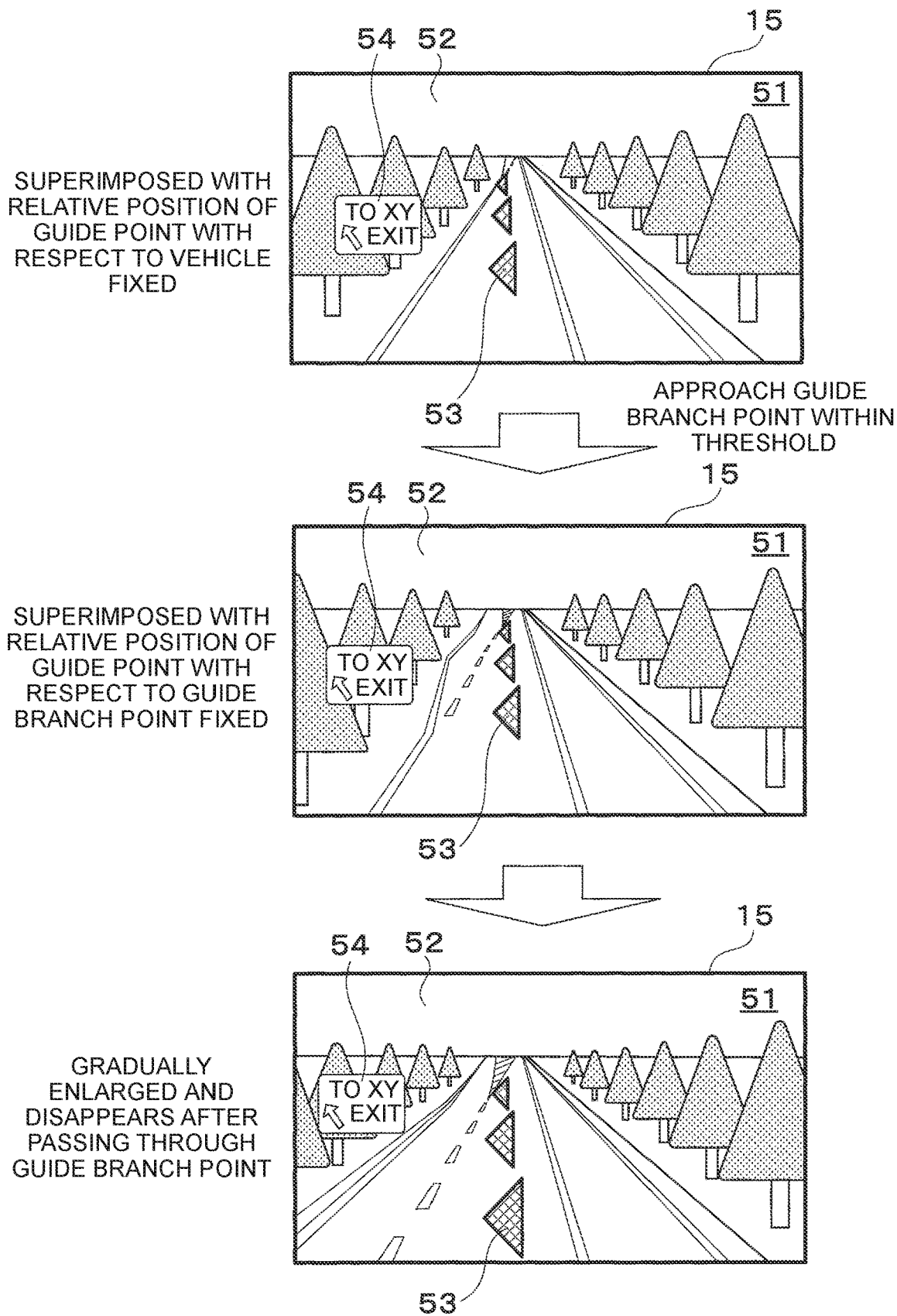
FIG. 9 illustrates a travel guide screen displayed on the liquid crystal display as the vehicle travels.

As a result, the travel guide screen 51 that is displayed on the liquid crystal display 15 as the vehicle travels is set to be a screen illustrated in FIG. 9. First, when the distance from the vehicle to the guide branch point is equal to or less than the guide starting distance (such as 300 m), the image 53 of the guide object is displayed in the first form in which the image 53 is superimposed on the view 52 ahead of the vehicle in the traveling direction captured by the front camera 19. The position at which the image 53 of the guide object is first superimposed is the position relatively fixed with respect to the present location of the vehicle such as 10 m ahead of the vehicle. In the first form, the image 53 of the guide object is visually recognized by the occupant as being superimposed with the relative position of the guide object with respect to the vehicle fixed. Then, for a while, the image 53 of the guide object is displayed to be superimposed with the image 53 of the guide object relatively fixed with respect to the present location of the vehicle. Since the relative position of the image 53 with respect to the vehicle is fixed, a display size of the image 53 of the displayed guide object is also fixed.

Subsequently, the vehicle approaches the guide branch point and the image 53 of the guide object displayed to be superimposed at the position that is relatively fixed with respect to the present location of the vehicle is superimposed on (reaches) the guide branch point (that is, when it is determined YES for the first time in S12), the first form is switched to the second form and then the relative position of the image 53 of the guide object with respect to the guide branch point in the view 52 is fixed. That is, the image 53 of the guide object is displayed with the image 53 fixed at the position at which the image 53 is superimposed on the guide branch point. Switching from the first form to the second form does not change the guide object to be displayed, and the guide object to be displayed is the same before and after switching. That is, the guide object to be displayed is the same and only the form in which the guide object is displayed (the form visually recognized by the occupant) is switched from the first form to the second form.

In the second form, the image 53 of the guide object is visually recognized by the occupant as being superimposed with the relative position of the guide object with respect to the guide branch point fixed. Then, the image 53 of the guide object is gradually enlarged as the vehicle approaches the guide branch point. At the timing at which the distance from the vehicle to the guide branch point becomes equal to or less than the guide ending distance (such as 30 m), the transparency of the image 53 of the guide object is increased (S7). At the timing at which the vehicle passes the guide branch point, the image 53 of the guide object disappears from the liquid crystal display 15 (S9). After the relative position of the image 53 of the guide object with respect to the guide branch point in the view 52 is fixed, the color of the image 53 of the guide object may be changed or the shape of the image 53 of the guide object may be changed to show the occupant that the relative position of the image 53 of the guide object with respect to the guide branch point in the view 52 is fixed.

Consequently, when the occupant of the vehicle visually recognizes the travel guide screen 51, the image 53 of the guide object indicating the exiting direction at the guide branch point can be clearly visually recognized even when the vehicle is far from the guide branch point and thus, at least the exiting direction at the guide branch point can be accurately recognized. Then, when the vehicle approaches the guide branch point to some extent, the image 53 of the guide object is superimposed on the guide branch point. Thus, the position of the guide branch point at which the vehicle is to turn right or left also becomes clear and the position of the guide branch point and the exiting direction at the guide branch point can be accurately recognized.

As described above in detail, with the navigation device 1, the drawing method of the image of the guide object, and the computer program executed by the navigation device 1 according to the first embodiment, the guide object for proposing the guide target point to be proposed is displayed if any guide target point is ahead of the vehicle in the traveling direction (S5), and in contrast, the guide object is displayed in the form in which the occupant visually recognizes the guide object as being superimposed with the relative position of the guide object with respect to the vehicle fixed when the distance from the vehicle to the guide target point is equal to or more than the threshold. Further, afterwards when the distance from the vehicle to the guide target point is less than the threshold, the guide object is displayed in the form in which the occupant visually recognizes the guide object as being superimposed with the relative position of the guide object with respect to the guide target point fixed (S12 to S20). Thus, it is possible to make the occupant clearly recognize a content of the guide object even when the distance from the vehicle to the guide target point is far. Therefore, a driving operation of the occupant can be suppressed from being delayed from the guidance and an appropriate driving operation can be performed. In contrast, the guide object is visually recognized by the occupant with the relative position of the guide object with respect to the guide target point fixed when the distance from the vehicle to the guide target point is near. Thus, it is possible to perform an effective guidance in which the guide target point and the guide object are associated with each other when visually recognized when the distance from the vehicle to the guide target point is near.

Second Embodiment

Next, a superimposed image display device according to a second embodiment will be described based on FIG. 10 and FIG. 11. In the description below, the same signs as those of the superimposed image display device according to the first embodiment in FIG. 1 to FIG. 9 indicate the same parts or corresponding parts as those of the configuration of the superimposed image display device etc. according to the first embodiment.

The schematic configuration of the superimposed image display device according to the second embodiment is nearly the same configuration as that of the superimposed image display device according to the first embodiment. Further, various control processes are nearly the same control processes as those of the superimposed image display device according to the first embodiment.

However, the superimposed image display device according to the second embodiment is different from the superimposed image display device according to the first embodiment in that the superimposed image display device according to the second embodiment uses a head-up display system as a unit that displays an image so that the image is superimposed on the view of the surroundings of the vehicle, while the superimposed image display device according to the first embodiment displays the captured image captured by the front camera 19 on the liquid crystal display 15 of the navigation device 1 and further displays the guide object on the liquid crystal display 15 so that the guide object is displayed so as to be superimposed on the view of the surroundings of the vehicle.

The schematic configuration of the superimposed image display device according to the second embodiment will be described below with reference to FIG. 10. FIG. 10 is a schematic configuration of a superimposed image display device 101 according to the second embodiment.

Figure 10:
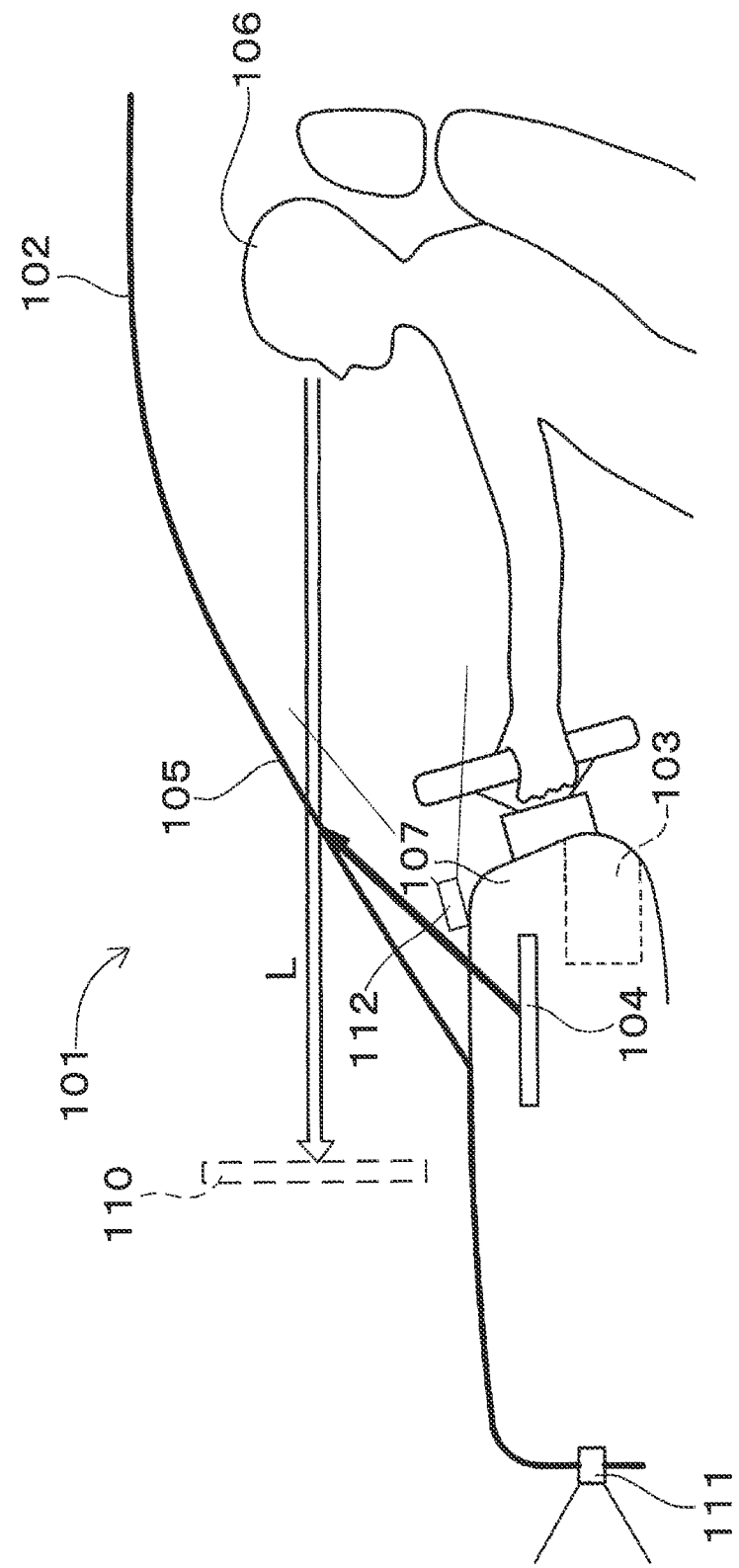
FIG. 10 is a schematic configuration diagram of a superimposed image display device according to a second embodiment.

As illustrated in FIG. 10, the superimposed image display device 101 basically has a navigation device 103 installed in a vehicle 102, and a front display 104 that is also installed in the vehicle 102 and that is connected to the navigation device 103. The front display 104 functions as a head-up display with a windshield 105 of the vehicle 102, and is an information providing unit that provides various types of information to an occupant 106 of the vehicle 102.

Here, the front display 104 is installed inside a dashboard 107 of the vehicle 102 and is a liquid crystal display having a function of displaying an image on an image display screen provided on a front surface. A cold cathode fluorescent lighting (CCFL) or a white light-emitting diode (LED) is used as a backlight. Other than the liquid crystal display, an organic electro-luminescent (EL) display or a combination of a liquid crystal projector and a screen may be used as the front display 104.

The front display 104 functions as the head-up display with the windshield 105 of the vehicle 102 and is configured to reflect an image output from the front display 104 on the windshield 105 ahead of a driver's seat to make the occupant 106 of the vehicle 102 visually recognize the image. The guide object is displayed on the front display 104 when required. In the second embodiment described below, the guide object is the guide information for guiding a user at the guide branch point that is in the future course of the vehicle and ahead of the vehicle in the traveling direction, similar to the first embodiment. More specifically, the guide object is an arrow, which is visually recognized at a position that is along the future course of the vehicle and that is above the road on which the vehicle is currently travelling and which indicates the exiting direction at the guide branch point.

The second embodiment is configured so that when the occupant 106 visually recognizes an image displayed on the front display 104 through reflection on the windshield 105, the image displayed on the front display 104 is visually recognized by the occupant 106 as a virtual image 110 that is not at a position on the windshield 105, but at a position far ahead of the windshield 105. The virtual image 110 is displayed to be superimposed on the environment (view, real view) of the surroundings ahead of the vehicle, and may be displayed to be superimposed on any object (such as a road surface, a building, or an object to pay attention to) that is positioned ahead of the vehicle, for example.

Here, a position at which the virtual image 110 is generated, more specifically, a distance L (hereinafter referred to as an imaging distance) from the occupant 106 to the virtual image 110 is determined by the position of the front display 104. For example, the imaging distance L is determined by a distance (optical path length) along an optical path from the position at which the image is displayed on the front display 104 to the windshield 105. For example, the optical path is set so that the imaging distance L is 1.5 m.

A front camera 111 is installed above a front bumper or behind a rearview mirror etc. of the vehicle. The front camera 111 is an image capturing device having a camera that uses a solid-state image sensor such as a CCD, and is disposed so that the optical axis extends forward in the traveling direction of the vehicle. Then, image processing is performed on a captured image captured by the front camera 111, so that the conditions of the front environment (that is, the environment on which the virtual image 110 is superimposed) visually recognized through the windshield by the occupant 106 are detected. It should be noted that a sensor such as a millimeter-wave radar may be used in place of the front camera 111.

An in-vehicle camera 112 is installed on an upper surface of the instrument panel of the vehicle. The in-vehicle camera 112 is an image capturing device having a camera using a solid-state image sensor such as a CCD, and is disposed so that the optical axis extends toward the driver's seat. A range in which a face of an occupant is generally expected to be positioned in the vehicle is set as a detection range (a capture range of the in-vehicle camera 112) and the face of the occupant 106 sitting in the driver's seat is captured by the in-vehicle camera 112. Then, image processing is performed on the captured image captured by the in-vehicle camera 112, thereby detecting a position of eyes of the occupant 106 (sight line start point) and a sight line direction.

Figure 11:
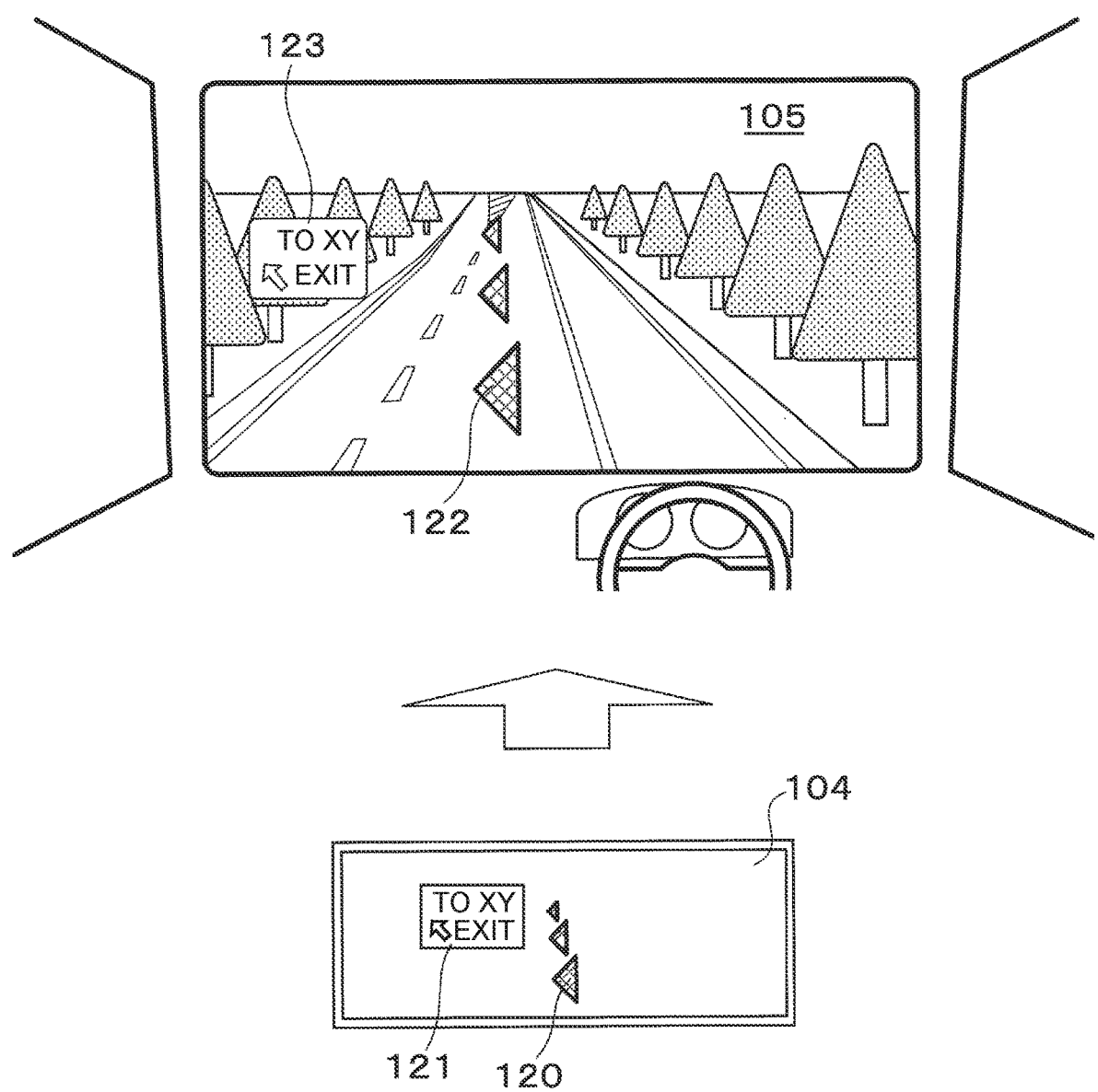
FIG. 11 illustrates a display example of the guide object in the superimposed image display device according to the second embodiment.

In S5 of the travel assistance processing program (FIG. 2) described above, the superimposed image display device according to the second embodiment displays images 120, 121 of the guide object on the front display 104 as illustrated in FIG. 11. As a result, the image 120 of the guide object displayed on the front display 104 as illustrated in FIG. 11 is superimposed on the view through the windshield 105, so that the occupant of the vehicle visually recognize the superimposed image 120 as a virtual image 122. In the same way, a virtual image 123 of the image 121 of the guide object is visually recognized as being superimposed on the view through the windshield 105.

It is thus possible to accurately recognize the course of the vehicle, the position of the guide branch point at which the vehicle turns right or left, and the exiting direction at the guide branch point, similar to the superimposed image display device according to the first embodiment. In the superimposed image display device according to the second embodiment, the shape of the guide object to be displayed and the position (range) at which the guide object is displayed on the front display 104 are determined in the guide object display position determination processing in S4. It is desired that the present location and the direction of the own vehicle specified in the three-dimensional space in S15 be the position of the occupant of the vehicle and the sight line direction of the occupant detected using the in-vehicle camera 112.

It should be understood that the preferred embodiment is not limited to the above embodiments, and various improvements and modifications may be made without departing from the scope.

For example, the liquid crystal display 15 on which the actual view image is displayed is used in the first embodiment and the head-up display system is used in the second embodiment, as a unit that displays the image so that the image is superimposed on the view of the surroundings of the vehicle. However, a windshield display (WSD) that displays the image on the windshield may be used. The WSD may display an image from a projector onto the windshield serving as a screen or the windshield may be a transmissive liquid crystal display. The image displayed on the windshield by the WSD is superimposed on the view of the surroundings of the vehicle.

Figure 12:
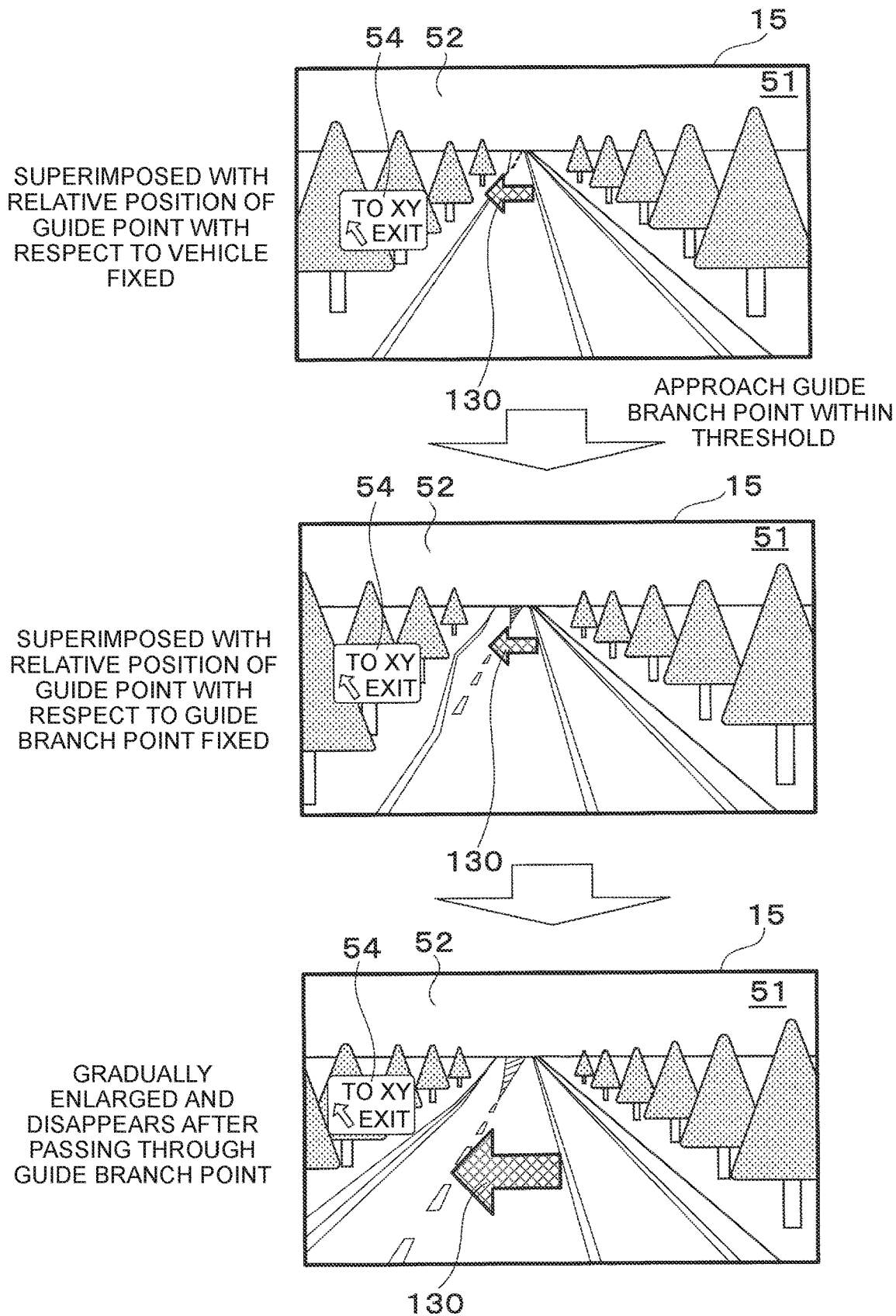
FIG. 12 illustrates a modification of the guide object.

In the first embodiment and the second embodiment, the guide object is the image of the arrows indicating the traveling direction of the vehicle at the guide branch point that is on the future course of the vehicle and that is ahead of the vehicle in the traveling direction. However, the guide object may be another image. For example, as illustrated in FIG. 12, the guide object may be an image 130 of an arrow. The image 130 of the arrow can be an arrow indicating the traveling direction of the vehicle at the guide branch point ahead of the vehicle in the traveling direction, and the image 130 can be displayed by switching from the first form to the second form as the vehicle approaches the guide branch point, similar to the first and second embodiments described above. Further, the guide object may be a warning image that warns the occupant of an object (such as other vehicles, pedestrians, and guide signs) to pay attention to, and partition lines of a lane in which the vehicle is traveling.

In the first and second embodiment, the guide branch point is proposed using the guide object. However, the point to be proposed by the guide object is not limited to the guide branch point, and may be another point to which the attention of the occupant needs to be drawn such as a lane reduction point or a merging section. It is desired that the content of the guide object to be displayed be changed based on the type of the guide target point.

In the first and second embodiment, the travel assist using the guide object is performed when traveling on an expressway and when traveling on a general road. However, the travel assist may be performed only when traveling on an expressway or only when traveling on a general road.

In the first embodiment, the actual view image captured by the front camera 19 and the guide object are displayed on the liquid crystal display 15 of the navigation device 1. However, the display on which the actual view image and the guide object are displayed may be a display other than the liquid crystal display 15 if it is a display disposed in the vehicle.

The second embodiment is configured so that the virtual image ahead of the windshield 105 of the vehicle 102 is generated by the front display 104. However, the virtual image may be generated ahead of a window other than the windshield 105. The image may be reflected on a visor (combiner) installed around the windshield 105, instead of being reflected on the windshield 105 by the front display 104.

In the first and second embodiment, the processing of the travel assistance processing program (FIG. 2) is executed by the navigation ECU 13 of the navigation device 1. However, the component that executes the processing may be appropriately changed. For example, a control unit of the liquid crystal display 15, a vehicle control ECU, or other in-vehicle devices may execute the processing.

Although the actualized embodiments of the superimposed image display device have been described above, the superimposed image display device may have the following configurations. In that case, the following effects are achieved.

For example, a first configuration is as follows.

A superimposed image display device (1) that is installed in a vehicle, and that displays a guide object (61 to 63) so that the guide object is visually recognized as being superimposed on a view of surroundings of the vehicle, the guide object proposing information to an occupant of the vehicle, the superimposed image display device including an object display unit (41) that displays the guide object for proposing a guide target point (60) to be proposed if any guide target point is ahead of the vehicle in a traveling direction, the object display unit displays the guide object in a first form in which the occupant visually recognizes the guide object as being superimposed with a relative position of the guide object with respect to the vehicle (64) fixed, when a distance from the vehicle to the guide target point is equal to or more than a threshold, and the object display unit displays the guide object in a second form in which the occupant visually recognizes the guide object as being superimposed with a relative position of the guide object with respect to the guide target point fixed, when the distance from the vehicle to the guide target point is less than the threshold.

With the superimposed image display device having the above configuration, the occupant visually recognizes the guide object with the relative position of the guide object with respect to the vehicle fixed when the distance from the vehicle to the guide target point is spaced away. Thus, it is possible to make the occupant clearly recognize the content of the guide object even when the distance from the vehicle to the guide target point is far. Therefore, a driving operation of the occupant can be suppressed from being delayed from the guidance and an appropriate driving operation can be performed. In contrast, the guide object is visually recognized by the occupant with the relative position of the guide object with respect to the guide target point fixed when the distance from the vehicle to the guide target point is near. Thus, it is possible to perform an effective guidance in which the guide target point and the guide object are associated with each other when visually recognized when the distance from the vehicle to the guide target point is near. Further, a timing at which the distance from the vehicle to the guide target point is the threshold is a timing at which the guide object is visually recognized such that at least a part of the guide object is superimposed on the guide target point. Thus, the position at which the guide object is displayed is not largely changed when the display form of the guide object is changed from the first form to the second form. Therefore, a sense of discomfort is not imparted to a user.

A second configuration is as follows.

A superimposed image display device (1) that is installed in a vehicle, and that displays a guide object (61 to 63) so that the guide object is superimposed on a view of surroundings of the vehicle when visually recognized, the guide object proposing information to an occupant of the vehicle, the superimposed image display device including an object display unit (41) that displays the guide object for proposing a guide target point (60) to be proposed if any guide target point is ahead of the vehicle in a traveling direction, in which the object display unit displays the guide object (61 to 63) by switching from a first form in which the occupant visually recognizes the guide object as being superimposed with a relative position of the guide object with respect to the vehicle (64) fixed to a second form in which the occupant visually recognizes the guide object as being superimposed with a relative position of the guide object with respect to the guide target point fixed, at a timing at which the guide object is visually recognized such that at least a part of the guide object is superimposed on the guide target point.

With the superimposed image display device having the above configuration, the occupant visually recognizes the guide object with switching being performed between the form in which the relative position of the guide object with respect to the vehicle is fixed and the form in which the relative position of the guide object with respect to the guide target point is fixed. Thus, the occupant can visually recognize the guide object in a visually recognizing form appropriate to a state, by changing the form in which the occupant visually recognizes the guide object based on the state, even if it is the same guide object. Specifically, the occupant can clearly visually recognize the content of the guide object regardless of the distance from the vehicle to the guide target point with the relative position of the guide object with respect to the vehicle fixed. In contrast, it is possible to perform an effective guidance in which the guide target point and the guide object are associated with each other when visually recognized with the relative position of the guide object with respect to the guide target point fixed. Further, the display form of the guide object is switched from the first form to the second form at a timing at which the guide object is visually recognized such that at least a part of the guide object is superimposed on the guide target point. Thus, the position at which the guide object is displayed is not largely changed. Therefore, a sense of discomfort is not imparted to a user.

A third configuration is as follows.

The object display unit (41) fixes a display size of the guide object (61 to 63) when the guide object is displayed in the first form, and the object display unit displays the guide object so that the display size of the guide object is enlarged in a stepped manner based on a distance from the vehicle (64) to the guide target point (60) when the guide object is displayed in the second form.

With the superimposed image display device having the above configuration, the display size of the guide object is fixed when the display form of the guide object is the first form and thus, it is possible to clarify that the guide object is not in a relative relationship with the guide target point. In contrast, the display size of the guide object is changed in accordance with the change in the vehicle position when the display form of the guide object is the second form and thus, it is possible to clarify that the guide object is in a relative relationship with the guide target point.

A fourth configuration is as follows.

The object display unit (41) displays the guide object (61 to 63) so that transparency of the guide object is increased in a stepped manner based on a distance from the vehicle (64) to the guide target point (60) when the guide object is displayed in the second form.

With the superimposed image display device having the above configuration, the transparency of the guide object is increased in a stepped manner as the vehicle approaches the guide target point, that is, the guide object in which the relative position of the guide object is fixed with respect to the guide target point. Thus, a decrease in visibility of the occupant of the vehicle in conjunction with the guide object in which the display size is enlarged is suppressed. Further, it is possible to make the occupant visually recognize that the vehicle passes through the guide object.

A fifth configuration is as follows.

The guide target point (60) is a guide branch point that is to be proposed, and the guide object (61 to 63) is an arrow indicating an exiting direction of the vehicle at the guide branch point.

With the superimposed image display device having the above configuration, the occupant visually recognizes the guide object with the relative position of the guide object with respect to the vehicle fixed when the distance from the vehicle to the guide branch point is spaced away. Thus, it is possible to make the occupant recognize beforehand, at least the exiting direction of the vehicle at the guide branch point, even if the distance from the vehicle to the guide branch point is far. In contrast, the occupant can visually recognize the guide object with the relative position of the guide object with respect to the guide branch point fixed when the distance from the vehicle to the guide branch point is near. Thus, it is possible to perform a clear guidance of the position of the guide branch point and the exiting direction at the guide branch point when the distance from the vehicle the guide branch point is near.

A sixth configuration is as follows.

The guide object (61 to 63) is generated based on a road shape of a road on which the vehicle (64) is currently traveling and a future course of the vehicle, and the object display unit (41) displays the guide object in a form in which the guide object is visually recognized as being superimposed at a position that is above the road on which the vehicle is currently traveling and that is along the future course of the vehicle.

With the above configuration, the occupant can easily recognize the future course of the vehicle visually, by having the occupant visually recognize the guide object.

A seventh configuration is as follows.

The guide target point (60) is a guide branch point that is to be proposed, and the guide object (61 to 63) includes a plurality of objects, and the object display unit (41) displays the objects in a form in which the objects are visually recognized as being superimposed at positions along the future course of the vehicle, at prescribed intervals, and the object display unit displays the objects so that the object visually recognized at a position closer to the guide branch point is visually recognized as being closer to a traveling direction side of the guide branch point with respect to the future course of the vehicle.

With the superimposed image display device having the above configuration, the occupant can easily recognize the future course of the vehicle visually due to the arrangement direction of the objects. Further, the traveling direction of the vehicle can be suggested beforehand by the position of the guide object, specifically if any guide branch point to be proposed is ahead of the vehicle in the traveling direction.

An eighth configuration is as follows.

The object display unit (41) displays the objects in a form in which the objects do not overlap each other by a prescribed percentage or more.

With the superimposed image display device having the above configuration, the occupant can recognize the arrangement direction of the objects, that is, the future course of the vehicle visually, by not having the objects overlap each other by a large amount.

What is claimed is:

1. A superimposed image display device that is installed in a vehicle, the superimposed image display device comprising:
a processor programmed to:
sequentially generate a guide object for a guide target point ahead of the vehicle in a traveling direction, the guide object being visually recognized as being superimposed on a view of surroundings of the vehicle, by:
first displaying the guide object located so an occupant visually recognizes the guide object as being superimposed with a relative position of the guide object with respect to the vehicle fixed, when a distance from the vehicle to the guide target point is equal to or more than a threshold; and
second displaying the same guide object located so the occupant visually recognizes the guide object as being superimposed with a relative position of the guide object with respect to the guide target point fixed, when the distance from the vehicle to the guide target point is less than the threshold.

2. The superimposed image display device according to claim 1, wherein a timing at which the distance from the vehicle to the guide target point is the threshold is a timing at which the guide object is visually recognized such that at least a part of the guide object is superimposed on the guide target point.

3. The superimposed image display device according to claim 1, wherein the processor is programmed to:
fix a display size of the guide object during the first displaying; and
display the guide object so that the display size of the guide object is enlarged in a stepped manner based on a distance from the vehicle to the guide target point during the second displaying.

4. The superimposed image display device according to claim 1, wherein the processor is programmed to display the guide object so that transparency of the guide object is increased in a stepped manner based on a distance from the vehicle to the guide target point during the second displaying.

5. The superimposed image display device according to claim 1, wherein
the guide target point is a guide branch point, and
the guide object is an arrow indicating an exiting direction of the vehicle at the guide branch point.

6. The superimposed image display device according to claim 1, wherein
the guide object is generated based on a road shape of a road on which the vehicle is currently traveling and a future course of the vehicle, and
the processor is programmed to display the guide object so that the guide object is visually recognized as being superimposed at a position that is above the road on which the vehicle is currently traveling and that is along the future course of the vehicle.

7. The superimposed image display device according to claim 6, wherein
the guide target point is a guide branch point,
the guide object includes a plurality of objects, and
the processor is programmed to:
display the plurality of objects so that the plurality of objects are visually recognized as being superimposed at positions along the future course of the vehicle, at prescribed intervals; and
display the plurality of objects so that a one of the plurality of objects that is visually recognized at a position closer to the guide branch point is visually recognized as being closer to a traveling direction side of the guide branch point with respect to the future course of the vehicle.

8. The superimposed image display device according to claim 7, wherein the processor is programmed to display the plurality of objects in a form in which the plurality of objects do not overlap each other by a prescribed percentage or more.

9. A superimposed image drawing method comprising the steps of:
sequentially generating an image of a guide object for a guide target point ahead of a vehicle in a traveling direction
the guide object being visually recognized as being superimposed on a view of surroundings of the vehicle, by:
first drawing the guide object so that an occupant visually recognizes the guide object as being superimposed with a relative position of the guide object with respect to the vehicle fixed, when a distance from the vehicle to the guide target point is equal to or more than a threshold; and
second drawing the same guide object located so the occupant visually recognizes the guide object as being superimposed with a relative position of the guide object with respect to the guide target point fixed, when the distance from the vehicle to the guide target point is less than the threshold.

10. A non-transitory computer-readable medium storing a computer program that causes a superimposed image display device that is installed in a vehicle to execute functions comprising:
sequentially generating a guide object for a guide target point ahead of the vehicle in a traveling direction, the guide object being visually recognized as being superimposed on a view of surroundings of the vehicle, by:
first displaying the guide object located so an occupant visually recognizes the guide object as being superimposed with a relative position of the guide object with respect to the vehicle fixed, when a distance from the vehicle to the guide target point is equal to or more than a threshold; and
second displaying the same guide object located so the occupant visually recognizes the guide object as being superimposed with a relative position of the guide object with respect to the guide target point fixed, when the distance from the vehicle to the guide target point is less than the threshold.

11. A superimposed image display device that is installed in a vehicle, the superimposed image display device comprising:
a processor programmed to:
sequentially generate a guide object for a guide target point ahead of the vehicle in a traveling direction, the guide object being visually recognized as being superimposed on a view of surroundings of the vehicle, by:
switching from first displaying the guide object located so an occupant visually recognizes the guide object as being superimposed with a relative position of the guide object with respect to the vehicle fixed to second displaying the same guide object so the occupant visually recognizes the guide object as being superimposed with a relative position of the guide object with respect to the guide target point fixed, at a timing at which the guide object is visually recognized such that at least a part of the guide object is superimposed on the guide target point.

12. The superimposed image display device according to claim 11, wherein the timing at which the guide object is visually recognized such that at least a part of the guide object is superimposed is a timing at which a distance from the vehicle to the guide target point is a threshold.

13. The superimposed image display device according to claim 11, wherein the processor is programmed to:
fix a display size of the guide object during the first displaying; and
display the guide object so that the display size of the guide object is enlarged in a stepped manner based on a distance from the vehicle to the guide target point during the second displaying.

14. The superimposed image display device according to claim 11, wherein the processor is programmed to display the guide object so that transparency of the guide object is increased in a stepped manner based on a distance from the vehicle to the guide target point during the second displaying.

15. The superimposed image display device according to claim 11, wherein
the guide target point is a guide branch point, and
the guide object is an arrow indicating an exiting direction of the vehicle at the guide branch point.

16. The superimposed image display device according to claim 11, wherein
the guide object is generated based on a road shape of a road on which the vehicle is currently traveling and a future course of the vehicle, and
the processor is programmed to display the guide object so that the guide object is visually recognized as being superimposed at a position that is above the road on which the vehicle is currently traveling and that is along the future course of the vehicle.

17. The superimposed image display device according to claim 16, wherein
the guide target point is a guide branch point,
the guide object includes a plurality of objects, and
the processor is programmed to:
display the plurality of objects so that the plurality of objects are visually recognized as being superimposed at positions along the future course of the vehicle, at prescribed intervals; and
display the plurality of objects so that a one of the plurality of objects that is visually recognized at a position closer to the guide branch point is visually recognized as being closer to a traveling direction side of the guide branch point with respect to the future course of the vehicle.

18. The superimposed image display device according to claim 17, wherein the processor is programmed to display the plurality of objects in a form in which the plurality of objects do not overlap each other by a prescribed percentage or more.

19. A superimposed image drawing method comprising the steps of:
sequentially generating a guide object for a guide target point ahead of a vehicle in a traveling direction,
is the guide object being visually recognized as being superimposed on a view of surroundings of the vehicle, by:
switching from first displaying the guide object located so an occupant visually recognizes the guide object as being superimposed with a relative position of the guide object with respect to the vehicle fixed to second displaying the same guide object so the occupant visually recognizes the guide object as being superimposed with a relative position of the guide object with respect to the guide target point fixed, at a timing at which the guide object is visually recognized such that at least a part of the guide object is superimposed on the guide target point.

20. A non-transitory computer-readable medium storing a computer program that causes a superimposed image display device that is installed in a vehicle to execute functions comprising:
sequentially generating a guide object for a guide target point ahead of the vehicle in a traveling direction, the guide object being visually recognized as being superimposed on a view of surroundings of the vehicle, by:
switching from first displaying the guide object located so an occupant visually recognizes the guide object as being superimposed with a relative position of the guide object with respect to the vehicle fixed to second displaying the same guide object so the occupant visually recognizes the guide object as being superimposed with a relative position of the guide object with respect to the guide target point fixed, at a timing at which the guide object is visually recognized such that at least a part of the guide object is superimposed on the guide target point.

* * * * *